(12) United States Patent
Shin et al.

(10) Patent No.: US 6,381,278 B1
(45) Date of Patent: Apr. 30, 2002

(54) HIGH ACCURATE AND REAL-TIME GRADUAL SCENE CHANGE DETECTOR AND METHOD THEREOF

(75) Inventors: Eui-Seob Shin; Hyeok-Man Kim; Min Gyo Chung; Woon-Kyung Kim; Byung-Woong Kwon; Sun-Geun Kim, all of Seoul (KR)

(73) Assignee: Korea Telecom, Seoul (KR)

( * ) Notice: Subject to any disclaimer, the term of this patent is extended or adjusted under 35 U.S.C. 154(b) by 0 days.

(21) Appl. No.: 09/440,197

(22) Filed: Nov. 15, 1999

(30) Foreign Application Priority Data

Aug. 13, 1999 (KR) ............................................. 99-33362
Oct. 26, 1999 (KR) ............................................. 99-46572

(51) Int. Cl.[7] ................................................ H04N 7/12
(52) U.S. Cl. ................................... 375/240.16; 348/700
(58) Field of Search ........................ 375/240.12, 240.13, 375/240.14, 240.15, 240.16; 348/699, 700, 402.1, 407.1, 413.1, 416.1; 382/236, 238, 243; 358/261.2, 430; 386/109, 111

(56) References Cited

U.S. PATENT DOCUMENTS 5,099,322 A * 3/1992 Gove ........................... 348/700
5,635,982 A * 6/1997 Zhang et al. ................ 348/231
5,801,765 A * 9/1998 Gotoh et al. ................. 348/155
6,055,025 A * 4/2000 Shahraray ................... 348/700
6,271,892 B1 * 8/2001 Gibbon et al. .............. 348/700
6,327,390 B1 * 12/2001 Sun et al. .................... 382/235

* cited by examiner

*Primary Examiner*—Vu Le
(74) *Attorney, Agent, or Firm*—Staas & Halsey LLP

(57) ABSTRACT

A high accurate and real-time gradual scene change detector and method thereof. The gradual scene change detector can enhance the automatic video analysis device to develop more efficient video library and multi-media service. Also, the detector can accomplish more convenient development and maintenance of the multi-media service. The high accurate and real-time gradual scene change detector comprises: a video pre-processor for decoding an image sequence of a digital video signal externally applied, for vectorizing; a video main processor for determining a state of the image sequence based on a distance between frames of image sequence inputted from the video preprocessor so as to declare a temporal dissolve, and for detecting an initial frame position and a final frame position of the declared dissolve; and a video post-processor for merging the declared temporal dissolve in accordance with the distance between the declared temporal dissolves by the video main processor, and for declaring a dissolve based on the distance between the initial frame position and the final frame position and a duration.

23 Claims, 21 Drawing Sheets

US 6,381,278 B1

HIGH ACCURATE AND REAL-TIME GRADUAL SCENE CHANGE DETECTOR AND METHOD THEREOF

BACKGROUND OF THE INVENTION

1. Field of the Invention

The present invention relates to an apparatus for detecting a gradual scene change applied to an automatic video analysis device for configuring a digital video library and a method thereof, more particularly to a detecting apparatus which can accurately detect a gradual scene change and execute a real-time processing, a method for performing the same, and a medium which can record a program for accomplishing the method and can be read by using a computer.

2. Description of the Prior Art

Generally, a video library stores much image data and the related various image indexing data as digital data, so users connect to a communication network such as the internet and retrieve the demanded image data through the indexing data by using the video library, and then the users receives and utilizes the searched image data. A video analysis device is a prerequisite for developing and maintaining the video library. The video analysis device should accurately detect a video scene change so that the resultant video clips are indexed and stored into a video database.

According to the conventional method for detecting the video scene change, several technologies are disclosed such as a twin comparison approach, a plateaus detection of a delayed frame metric, an image variance valley detection and a video edit model approach. Such technologies greatly depend on a specific parameter requiring a close control or a selection of a threshold from a viewpoint of their efficiency. Also, those technologies may not detect a gradual scene change including fade-in, fade-out and dissolve. Furthermore, the conventional methods may not detect the gradual scene change or they cannot accurately discriminate the duration of the scene change though they may detect the scene change.

SUMMARY OF THE INVENTION

Considering the above-mentioned problems, it is an object of the present invention to provide an apparatus for accurately detecting a gradual scene change and executing a real-time processing.

It is another object of the present invention to provide a method for detecting the gradual scene change and executing the real-time processing which is applied to the apparatus.

It is still another object of the present invention to provide a medium for recording medium for storing a program that accomplishes the above method and is read by using a computer.

It is still another object of the present invention to provide an apparatus for greatly enhancing a performance of an auto video analysis device used for implementing a video library demanded by a multimedia service.

It is still another object of the present invention to provide a method for accomplishing an enhanced performance of the auto video analysis device used for implementing the video library demanded by the multimedia service.

Also, it is still another object of the present invention to provide a recording medium for storing a program that accomplishes the method for accomplishing the enhanced performance of the auto video analysis device.

To achieve the above objects of the present invention, there is provided a gradual scene change detector for detecting a gradual scene change, comprising: a video pre-processor for decoding an image sequence of a digital video signal externally applied, for vectorizing; a video main processor for determining a state of the image sequence based on a distance between frames of image sequence inputted from the video preprocessor so as to declare a temporal dissolve, and for detecting an initial frame position and a final frame position of the declared dissolve; and a video post-processor for merging the declared temporal dissolve in accordance with the distance between the declared temporal dissolves by the video main processor, and for declaring a dissolve based on the distance between the initial frame position and the final frame position and a duration.

In preferred embodiments, the video pre-processor comprises: a video decoder for decoding an image sequence of the digital video signal; and a video vectorizor for converting the decoded image sequence from the video decoder into vector. The video vectorizor projects or sub-samples the decoded DC image sequence in a predetermined direction so as to perform a data-compression, thereby vectorizing.

The video main processor comprises: a linear image predictor for predicting a linear image based on the vectorized image sequence from the video pre-processor; a first frame distance measurement device for measuring a distance between image frames based on a reference image from the linear image predictor; so as to produce a first measured distance; a second frame distance measurement device for measuring a distance between image frames based on the linear predicted image from the linear image predictor; so as to produce a second measured distance; a subtractor for producing a difference between the first measured distance and the second measured distance; a signal converter for converting the difference from the subtractor in accordance with whether any rapid scene changes is made or not; an accumulator for accumulating the difference of the subtractor applied from the signal converter; and a dissolve declaring/frame detecting device for declaring the temporal dissolve based on an accumulated value from the accumulator, and for detecting the initial frame position and the final frame position of the declared temporal dissolve.

If any rapid scene change is detected, the signal converter converts the difference of the subtractor into "0"; if not, the signal converter transfers the difference of the subtractor to the accumulator.

The linear image predictor comprises: a first delay element for delaying the vectorized DC image sequence from the video pre-processor by a predetermined time; a second delay element for re-delaying the delayed image from the first delay element; an adder for adding the vectorized DC image and the re-delayed image from the second delay element; and a multiplier for multiplying the output value from the adder and a coefficient(e.g. '1/2'), so as to produce a linear predicted image.

The first frame distance measurement device comprises: a histogram information extracting element for extracting a histogram information based on the delayed reference image from the linear image predictor; a delay element for delaying the extracted histogram information from the histogram information extractor by a predetermined time; and a vector distance measurement device for measuring a vector distance between the extracted histogram information from the histogram information extractor and the delayed histogram information.

The second frame distance measurement device comprises: a histogram information extractor for extracting a histogram information based on the linear predicted image from the linear image predictor; a vector distance measurement device for measuring a vector distance based on the extracted histogram information from the histogram information extractor and an extracted histogram information of the first frame distance measurement device.

The accumulator comprises: a discriminator for discriminating an output signal from the signal converter to '0' or '1'; an adder for adding the output signal of the signal converter and a feedback accumulated value (D(i−1)); a multiplier for multiplying the output signal of the discriminator and the added value of the adder so as to produce an accumulated value(D(i)); and a delay element for delaying the accumulated value from the multiplier by a predetermined time so as to feedback the delayed value to the adder. The dissolve declaration and the temporal dissolve declaration of the frame detector is performed by: finding an accumulated value such that the highest value of the accumulated value (D(i)) within a duration longer than '0' is higher than a predetermined duration threshold value ($Th_{CLD}$); if the duration of the found accumulated value (D(i)) is longer than a predetermined continuation threshold value ($Th_{con}$), declaring the accumulated value as a temporal dissolve; and otherwise, the declaration being not performed. The video post-processor comprises: a dissolve merging processor for confirming whether the distance between the declared temporal dissolves from the video main processor is smaller than a predetermined merging threshold value, and if so, for merging the smaller dissolves into one; and a dissolve declaration processor for confirming whether the distance between the initial frame position and the final frame position is higher than a predetermined distance threshold value so as to declare a dissolve.

The dissolve merging processor confirms whether the distance between the declared temporal dissolves from the video main processor is smaller than the predetermined merging threshold value ($TH_{link}$); if so, the dissolve merging processor merges the dissolves having smaller distance into one dissolve; and otherwise, the dissolve merging processor transfers the declared temporal dissolve to the dissolve declaration processor, wherein the dissolve declaration processor confirms whether the distance between the initial frame position and the final frame position of the dissolve merging processor is higher than the predetermined distance threshold value ($Th_{dist}$); if so, the dissolve declaration processor declares a dissolve when the distance between the initial frame position and the final frame position applied thereto is higher than the predetermined duration threshold value ($Th_{dur}$).

According to another aspect of this invention, there is provided a method for detecting a gradual scene change comprising the steps of: decoding an image sequence of digital video signal externally applied for vectorization; discriminating the state of the image sequence based on the distance between frames in the vectorized image sequence so as to declare a temporal dissolve and detecting a initial frame position and a final frame position of the declared temporal dissolve; and merging the declared temporal dissolve in accordance with the distances of the declared temporal dissolve and declaring a dissolve in accordance with the distance between the initial and the final frames and the duration. The third step may further comprise: a fourth step of confirming whether the distance between the declared temporal dissolves is a predetermined merging threshold value ($Th_{link}$); a fifth step of merging the dissolves having the smaller distance into one, if the result of the step of the fourth step is positive, and otherwise transferring the declared temporal dissolve as it is; a sixth step of confirming whether the distance between the initial frame and the final frame of the transferred dissolve is higher than a predetermined distance threshold value ($Th_{res}$) and the distance between the initial frame position and the final frame position of the transferred dissolve is higher than a predetermined duration threshold value; and a seventh step of declaring a dissolve if the result of the sixth step is positive.

According to still another aspect of this invention, there is provided a computer program device readable by a machine, tangibly embodying a program of instructions executable by the machine to perform a method comprising: a first function of decoding an image sequence of digital video signal externally applied, so as for vectorization; a second function of discriminating a state of the image sequence based on a frame distance between the vectorized image sequence so as to declare a temporal dissolve and detecting a initial frame position and a final frame position of the declared temporal dissolve; and a third function of merging the declared temporal dissolves in accordance with the distance between the declared temporal dissolves and declaring the dissolve in accordance with a distance and a duration between the initial frame and the final frame.

BRIEF DESCRIPTION OF THE DRAWINGS

The above objects and advantages of the present invention will be more apparent by describing in detail the preferred embodiment thereof with reference to the attached drawings, in which.

DETAILED DESCRIPTION OF THE INVENTION

Hereinafter, the preferred embodiment of the present invention will be explained in more detail with reference to the accompanying drawings.

Figure 1:
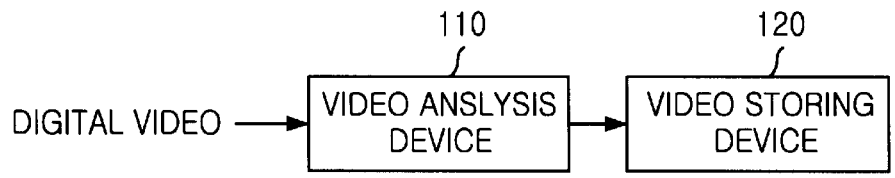
FIG. 1 is a schematic view for showing a configuration of a video library according to an embodiment of the present invention.

FIG. 1 is a schematic view for showing a configuration of a video library according to one embodiment of the present invention.

Referring to FIG. 1, the video library comprises a video analysis device 110 and a video storage device 120.

The operation of the video library having the above-configuration will be described as follows.

The video image analysis device 110 extracts various images indexing information demanded by construction of the video library to store the data into the video storage device 120 after the video image analysis 110 analyzes inputted images. The extracted indexing information comprises the data connected with the frame in which the scene change of an image occurs, the data related to the similar scenes (for example, the clustering data) and the data related to each rotary image of each scene.

The digital videos are stored into the video storage device 120 after the digital videos are divided into unit groups through an analysis process of the video analysis device 110 according to their contents and various characteristics. Therefore, users can retrieve the video storage device 120, and then easily find and utilize the digital video that they want to use.

Figure 2:
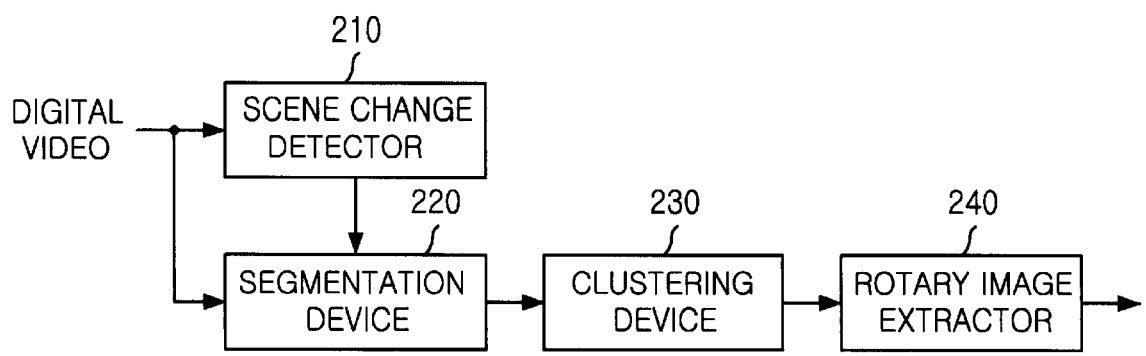
FIG. 2 is a detailed view for illustrating a video analysis device in FIG. 1 according to an embodiment of the present invention.

FIG. 2 is a detailed view for illustrating a video analysis device in FIG. 1 according to an embodiment of the present invention.

Referring to FIG. 2, the video analysis device 110 comprises a scene change detector 210, a segmentation device 220, a clustering device 230 and a rotary image extractor 240.

The image that users watch is manufactured through an edit process comprising continuous attachment of the filmed source images and creation of an editing effect.

In the edit process, it is called an abrupt scene change that the scene change suddenly occurs at a frame such as a cut in which the source images merely attached. Otherwise, it is called a gradual scene change that the scene change occurs in several frames such as fade-in, fade-out and dissolve. The scene change detector 210 automatically detects such scene change.

The segmentation device 220 divides one digital video inputted form the outside into several digital video segments by using the scene change detection result inputted from the scene change detector 210.

The length of each scene generally has a time of 5 to 30 seconds though it is greatly various in case of a movie, news or an advertisement. In the indexing process, the indexing process efficiently accomplished when such short scenes are bound as the similar scenes.

The clustering device 230 automatically clusters the similar scenes among the serious scenes divided by the segmentation device 220.

The rotary image extractor 240 automatically generates rotary scenes respectively representing the scenes clustered by the clustering device 230.

Figure 3:
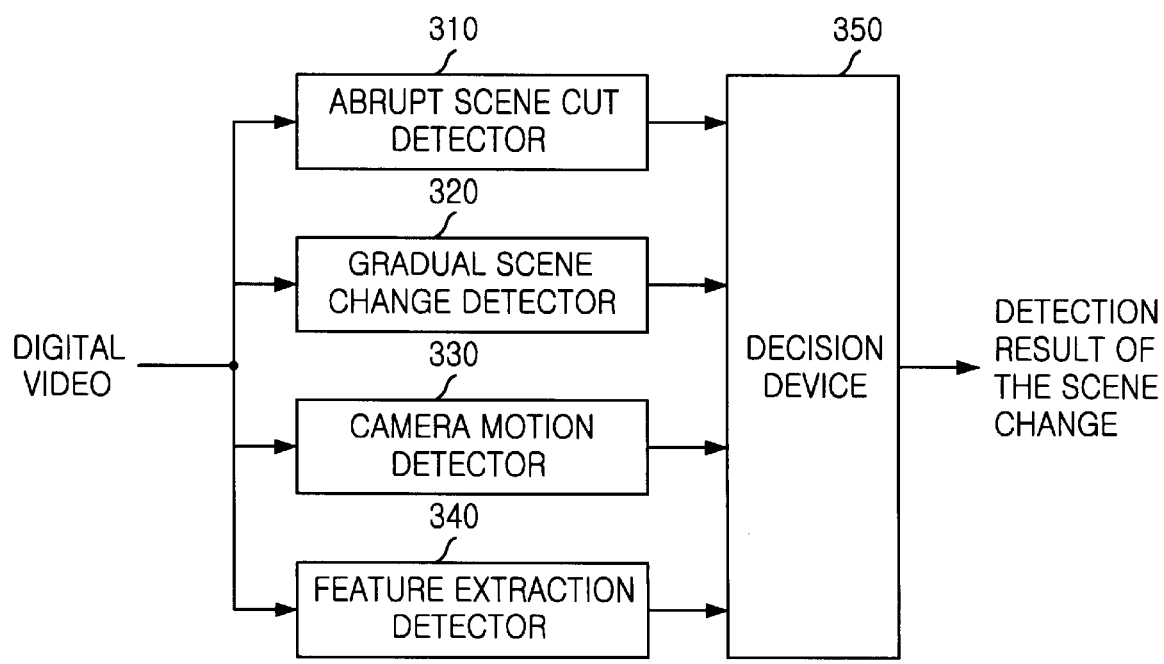
FIG. 3 is a detailed view for illustrating a scene change detector in FIG. 2 according to an embodiment of the present invention.

FIG. 3 is a detailed view for illustrating a scene change detector in FIG. 2 according to an embodiment of the present invention.

Referring to FIG. 3, the scene change detector 210 comprises an abrupt scene cut detector 310, a gradual scene detector 320, a camera motion detector 330, a feature extraction device 340 and a decision device 350.

The abrupt scene cut detector 310 automatically detects the cut of the image edit effect, and the gradual scene change detector 320 automatically detects the fade-in, the fade-out and the dissolve of the image edit effect.

The camera motion detector 330 automatically detects the motion of the camera (that is, a panning, a zooming and a tilting) used in each scene.

The feature extraction device 340 automatically sorts the images according to the criterion established by the user who executes the indexing such as the user who inputs the images into the video library. For example, when the user sorts the scenes into a landscape and a close-up or a scene having much motions and a scene having little motions, the feature extraction device 340 automatically sorts the scenes by calculating the parameter corresponding to the criterion.

The decision device 350 decides the final result of the scene change detection after it receives the results processed by the abrupt scene cut detector 310, the gradual scene change detector 320 and the camera motion detector 330.

The following mathematical expressions are utilized for the scene change detection process of the gradual scene change detector.

At first, when the ith image (wherein m and n respectively represent the width and the length of the image) is $f_i$, the image is expressed by utilizing the following mathematical expression (1).

$$f_i \leftrightarrow \{f(x, y, i)\}_{(x,y)=(0,0)}^{(m-1,n-1)} \leftrightarrow \begin{bmatrix} f(0, 0, i) \\ f(1, 0, i) \\ \vdots \\ f(m-1, n-1, i) \end{bmatrix} \quad (1)$$

wherein f(x, y, i) is a vector form and means the value of the pixel of the (x, y) coordinates in ith image.

When the histogram information $H(f_i)$ corresponding the $f_i$ is supposed that $H(f_i)$ has the Bin numbers of bin, the $H(f_i)$ is expressed by utilizing the following mathematical expression (2).

$$H(f_i) \leftrightarrow \{H(f_i, k)\}_{k=0}^{Bin-1} \leftrightarrow \begin{bmatrix} H(f_i, 0) \\ H(f_i, 1) \\ \vdots \\ H(f_i, Bin) \end{bmatrix} \quad (2)$$

wherein $H(f_i, k)$ means the value of the kth bin of the histogram of the $f_i$ (the ith image)

Also, when the image sequence F is the set of the images in a serious of scene, the image sequence F and the histogram sequence H of the image sequence are expressed as the following mathematical expression (3).

$$F \triangleq \{fi\}_{i=0}^{N}, H \triangleq \{H(f_i)\}_{i=0}^{N} \quad (3)$$

In the above mathematical expression (3), when the i is fixed, the histogram $H(f_i, k)$ shows the scaled valve of the probability mass function (PMF) as the following mathematical expression (4) in case that the value of the image f(x, y, i) may be regarded as the independent identically distributed random number.

$$\Pr(f(x, y, i) = k) = \frac{H(f_i, k)}{m * n} \quad (4)$$

Also, the image histogram H has the non-linear characteristic such as the following mathematical expression (5).

$$H(\alpha * f_i + \beta * f_j, k) \neq \alpha * H(f_i, k) + \beta * H(f_j, k) \quad (5)$$

The QS[T] means the quasi-stationary state in the duration of T. If the following mathematical expression (6) can apply to not all the t but only the condition of the following mathematical expression (7), the random process f(x, y, i) is the quasi-stationary state in the duration of T.

$$-\frac{T-1}{2} \leq t \leq \frac{T-1}{2} \quad (7)$$

A noisy sequence is regarded as the image besides the dissolve. A Pseudo Metric is a method for measuring the distance between the images and utilizes the following mathematical expressions.

The absolute value of the finite difference between the pixels can be calculated by a first distance measurement method $d_{1(\ )}$ according to the following mathematical expression (8).

$$d_1(f_i, f_{i+1}) \triangleq \|f_i - f_{i+1}\|_1 = \sum_{x,y} |f(x, y, i) - f(x, y, i+1)| \quad (8)$$

wherein, $\|\_\|_1$ is the $l_1$ norm and can be given in accordance with the following mathematical expression (9) when $x=[x1, x2, \ldots, x_n]^t$.

$$\|x\|_1 \equiv \sum_{i=1}^{\infty} |x_i| \quad (9)$$

The absolute value of the finite difference of the histogram can be calculated by a second distance measurement method $d_{2(\ )}$ as the following mathematical expression (10).

$$d_2(f_i, f_{i+1}) \triangleq d_1(H(f_i), H(f_{i+1})) = \|H(f_i) - H(f_{i+1})\|_1 \quad (10)$$
$$= \sum_k |H(f_i, k) - H(f_{i+1}, k)|$$

Also, the exclusive OR between the binary pixels can be calculated by a third distance measurement method $d_{3(\ )}$ according to the following mathematical expression (11).

$$d_3(f_i, f_{i+1}) \triangleq d_1 T(f_i), T(f_{i+1})) = \|T(f_i) - T(f_{i+1})\|_1 \quad (11)$$
$$= \sum_{x,y} T(f(x, y, i)) \oplus T(f(x, y, i+1))$$

wherein T(f(x, y, i)) meets the condition of the following mathematical expression (12).

$$T(f(x, y, i)) = \begin{cases} 1, & \text{if } f(x, y, i) \geq E[f(x, y, i)] \\ 0, & \text{if } f(x, y, i) < E[f(x, y, i)] \end{cases} \quad (12)$$

The first distance measurement method assumes the absolute value after the directly subtracting from the pixel domain so that it is sensitive to the motion of the image and the brightness variation of the image.

The second distance measurement method, however, may regard the distance between the images as the distance of the probability mass function PMF, so the second method is little sensitive to the motion of the image and can reflect the entire brightness variation of the image.

The third distance measurement method makes the binary image by using the mean value of the image E[f(x, y, i)], and then joins the number of disagreement points. The third method is little sensitive to the entire brightness variation of the image though it is sensitive to the motion of the image.

For example, the second method $d_2(\ )$ has the value of '0' in accordance with the mathematical expression in case that there is a two dimensional rigid local motion where an object do not overlap in the image without the input and the output of the object and a predetermined background among the images. In the time of the image such as the gradual scene change the second method $d_2(\ )$ has a relatively large value concerning the variation of the linear pattern.

Also, the second method $d_2(\ )$ can accomplish approximate measurement through the differences of an average and a distribution among the statistical characteristics between two images. However, the second method $d_2(\ )$ can accurately accomplished when the $f_i$ is a gaussian random process.

The general model of the gradual scene change sequence such as the following mathematical expression (13) is expressed as the following mathematical expression (14). The general model includes the fade-in, the fade-out and the dissolve.

$$F=\{f_i\}_{i=0}^N \quad (13)$$

$$f(x,y,i)=\alpha(i,N)g^1(x,y,i)+\beta(i,N)g^2(x,y,i), \; 0\leq i\leq N \quad (14)$$

That is, the sequences $F_1$ and $F_2$ as the following mathematical expressions (15) and (16) are the QS[3]. The $\alpha(i,N)$ which is equal than '0' is monotonous increment function and the $\beta(i,N)$ which is less than '1' is a monotonous decrement function so that $\alpha(0,N)$ is '1', $\alpha(N,N)$ is '0', $\beta(0,N)$ is '0' and $\beta(N,N)$ is '1'.

$$F_1 = \{g_i^1\}_{i=0}^N \quad (15)$$

$$F_2 = \{g_i^2\}_{i=0}^N \quad (16)$$

For example, the fade-in corresponds to the following mathematical expression (17) and the fade-out corresponds to the following mathematical expression (18).

$$g^1(x,y,i)=c_1 \quad (17)$$

$$g^2(x,y,i)=c_2 \quad (18)$$

That is, the fade-in and the fade-out may be the special case of the dissolve. The most typical gradual scene change is a linear model and is expressed according to the following mathematical expressions (19) and (20).

$$\alpha(i,N)=1-i/N \quad (19)$$

$$\beta(i,N)=i/N \quad (20)$$

However, the $\alpha(i,N)$ and the $\beta(i,N)$ have the shape of piece-wise linear since the $\alpha(i,N)$ and the $\beta(i,N)$ are respectively the monotonous increment and the monotonous decrement functions.

Hence, an image $\hat{f}_i$ of the vectored linear prediction direct current (DC) can reduce the bad influence and the computing amount of the motion concerning an image $f_i$ of the sequence which is in the state of the scene change on the basis of the piece-wise linearity, so that the image $\hat{f}_i$ of the vectored linear prediction DC is represented as the following mathematical expression (21).

$$\hat{f}_i(F) = \frac{f_{i-1}+f_{i+1}}{2} \; (\text{or } \hat{f}_i) \; \text{for } i = 1, 2, \cdots, N-1 \quad (21)$$

That is, the image $\hat{f}_i$ vectored linear prediction DC is expressed according to the following mathematical expression (22).

$$\hat{f}_i = \begin{bmatrix} \hat{f}(0,0,i) \\ \hat{f}(1,0,i) \\ \vdots \\ \hat{f}(m-1,n-1,i) \end{bmatrix} \quad (22)$$

$$= \begin{bmatrix} \text{round}\left(\frac{f(0,0,i-1)+f(0,0,i+1)}{2}\right) \\ \text{round}\left(\frac{f(1,0,i-1)+f(1,0,i+1)}{2}\right) \\ \vdots \\ \text{round}\left(\frac{f(m-1,n-1,i-1)+f(m-1,n-1,i+1)}{2}\right) \end{bmatrix}$$

wherein, the round means the round up process. When the $d(\ )$ is regarded as the general distance measurement method between the images, the distance between the prediction image $\hat{f}_i$ of the image $f_i$ calculated from the both images and the $f_i$ can be expressed in accordance with the following mathematical expression (23). At that time, the prediction image $\hat{f}_i$ of the image $f_i$ is indicated as the following mathematical expression (24).

$$d(\hat{f}_i(F), f_i) = 0 \quad (23)$$

$$\hat{f}_i = \frac{f_{i-1}+f_{i+1}}{2} \quad (24)$$

The method for detecting the gradual scene change which is similar to the above method utilizes the primary and the secondary differentiations, and then derivates the following mathematical expression (25) by using the on the basis of the model of $d_1(\ )$ in the above mathematical expression (14).

$$\nabla^2(f_i)=\tfrac{1}{2}\|f_{i-1}+f_{i+1}-2f_i\|_1=d_1(\hat{f}_i(F),f_i)=0 \quad (25)$$

$$\nabla(f_i)=d_1(f_{i-1},f_i) \quad (26)$$

Also, the method detects the gradual scene change on the basis of the $\nabla(f_i)$ in the above mathematical expression (26) which is relatively larger than the $\nabla^2(f_i)$ in the above mathematical expression (25) in the duration of the gradual scene change.

As it is described above, the fact is illustrated centering around the distance measurement methods (namely, $d_1(\ )$ and $d_2(\ )$) whether the mathematical expressions (24) and (25) have sufficient discretions in other non-dissolve sequence QS[3], and the superiority of the methods will be mathematically proved. A gradual scene change algorithm will be explained on the basis of the proved result.

As for the distance measurement method in the image sequence, the non-dissolve and the gradual scene sequence will be compared by utilizing the two methods (that is, $d_1(\ )$ and $d_2(\ )$) below the above mathematical expression (24).

At first, the primary differentiation $\nabla(f_i)$ and the secondary differentiation $\nabla^2(f_i)$ are roughly expressed as the following mathematical expressions (27) and (28).

$$\nabla(f_i) \approx \frac{d_1(f_{i-1},f_i)+d_1(f_i,f_{i+1})}{2} \quad (27)$$

$$\nabla^2(f_i)=d_1(\hat{f}(F),f_i) \quad (28)$$

The methods $d_1(\ )$ and $d_2(\ )$ are compared each other by using the following mathematical expressions (29) and (30).

$$\frac{d_1(f_{i-1}, f_i) + d_1(f_i, f_{i+1})}{2} \geq d_1(\hat{f}_i(F), f_i), \forall i \qquad (29)$$

$$\frac{d_2(f_{i-1}, f_i) + d_2(f_i, f_{i+1})}{2} \geq d_2(\hat{f}_i(F), f_i), \forall i \qquad (30)$$

In the mathematical expression (29), the relative comparison between the primary and the secondary differentiations becomes to have a poor discretion from the triangular inequality of the $d_1(\ )$. However, the triangular inequality does not applied to the $d_2(\ )$ since the $d_2(\ )$ is not the norm. The characteristic of the $d_2(\ )$ and sever definition will be given the following mathematical expressions.

$$M(i) \triangleq d_2(f_{i-1}, f_i) \qquad (31)$$

$$N(i) \triangleq d_2(\hat{f}_i(F), f_i) = d_2\left(\frac{f_{i-1} + f_{i+1}}{2}, f_i\right) \qquad (32)$$

$$Q(i) \triangleq M(i) - N(i) \qquad (33)$$

wherein, the $M(i)$ of the mathematical expression (31) means the $d_2(\ )$ of the sequence and the $N(i)$ of the mathematical expression (32) represents the distance $d_2(\ )$ between the predicted frame $\hat{f}_i(F)$ and the $f_i$. As it is described above, the $d_2(\ )$ can be roughly measured through the difference between the means and the distributions of the statistical characteristics of the images. Finally, the $Q(i)$ of the mathematical expression (33) means the difference between the $M(i)$ and $N(i)$, which reflects the state of the moving image (that is, the dissolve and the non-dissolve QS[3].

According to the first case, when the following mathematical expression (34) is applied to the sequence without motion or the sequence having the motion of the object and the motion of the camera (non-dissolve QS[3]), the sequence will be expressed as the following mathematical expression (34) if the sequence is the QS[3] having an average $\mu_f$ and a distribution $\sigma_f^2$.

$$Q(i) = M(i) - N(i) \leq 0 \qquad (34)$$

When the image sequence does not have the motion in the image (that is, a stationary image sequence), the sequence follows the mathematical expressions (35) and (36) since the statistical characteristics of the sequence are identical as shown the above mathematical expressions (29) and (30). The PMF of the $f_i$ or the histogram is partially (that is, for 3 frames $[f_{i-1}, f_i, f_{i+1}]$) and constantly seen when the sequence has the motion of the image and the motion of the camera (namely, the zoom, the pan and the tilt). At that time, the $M(i)$ is nearly '0' since the $M(i)$ has the approximately same distribution as the average of the frames. However, when the random motions of all the pixels while intensity ingredients are maintained such as the sequence having the abrupt scene change, the $N(i)$, an extreme case, is generally bigger than the $M(i)$ to accomplish the following mathematical expression (37) due to the distribution difference between the $\hat{f}_i(F)$ and the $f_i$ since the distribution difference between the histogram of the $\hat{f}_i(F)$ and the histogram of the f_i increases when the $f(x, y, i-1)$ and the $f(x, y, i+1)$ are uncorrelated each other.

$$M(i) = N(i) = 0 \qquad (35)$$

That is, the expression (35) is the same as the following mathematical expression (36).

$$M(i) - N(i) = 0 \qquad (36)$$

$$M(i) - N(i) < 0 \qquad (37)$$

In the second case of the sequence having the abrupt scene change, when the $f_i$ is the abrupt scene change in the F and each subsequences are QS[3] such as the subsequence $1[\ldots, f_{i-3}, f_{i-2}, f_{i-1}]$ having the motion and the subsequence $2[f_i, f_{i+1}, f_{i+2}, \ldots]$ having the motion, the sequence can be expressed in accordance with the following mathematical expression (38).

$$Q(i-1) = M(i-1) - N(i-1) << 0, Q(i) = M(i) - N(i) >> 0 \qquad (38)$$

As for the third case that the sequence having the dissolve, if the F is the dissolve of the $F_1$ and $F_2$, the sequence can be expressed as the following mathematical expression (39) when the sequence $F_1$ having the motion is the QS[3] having the $\mu_1$ and the $\sigma_1^2$ and the sequence $F_2$ having the motion is the QS[3] having the $\mu_2$ and the $\sigma_2^2$.

$$Q(i) = M(i) - N(i) > 0 \; i = 1, 2, \ldots, N-1 \qquad (39)$$

As it is described in the third case, the vectored linear prediction DC image $\hat{f}_i$ is expressed as the above expression (24) on the basis of the linear model of the above mathematical expression (14). While that the distance $N(i)$ from the $f_i$ is nearly '0', the distance $M(i)$ between the histogram $H(f_{i-1}, k)$ and the $H(f_i, k)$ is relatively bigger than the $N(i)$.

The instantaneous dissolve detection rule is assumed as the following mathematical expression (40) on the basis of the process for detecting a maximum likelihood by utilizing the above mathematical expressions (34) and (39). The hypotheses utilizes the dissolve sequence and the non-dissolve sequence. In this case, the QS[3] sequence dissolve is assumed as $H_n$ and the dissolve sequence is assumed as $H_d$.

$$Q(i) \begin{matrix} H_d \\ > \\ < \\ H_n \end{matrix} 0 \qquad (40)$$

The expression (40) can be applied to the instantaneous detection method which discriminates that the $Q(i)$ is the dissolve when the $Q(i)$ is bigger than '0' or the $Q(i)$ is the dissolve when the $Q(i)$ is smaller than '0'. The probable approximate value by using such $Q(i)$ has a considerable discretion in case that the non-dissolve and the dissolve sequences having the $d_2(\ )$ which is relatively smaller than the $d_1(\ )$. That is, the error probability may reduce by decreasing the distribution of the conditional probability between the dissolve and the non-dissolve. Hence, the ith image can be guessed by verifying the instantaneous sign and magnitude of the Q value instantaneous sign and magnitude. However, though the occurrence probability of the dissolve is higher than the occurrence probability of the dissolve due to the condition of the following mathematical expression 41, the error probability may increase due to the assumption in the following mathematical expression (42) in the ML detection method, so the post-processing process and the maximum aposteriori (MAP) type $D(i)$ should be demanded. The following diversity is promoted MAP type $D(i)$ in which the continuous pattern of the Q value is reflected.

As for the sequence having the abrupt scene cut, the Q value at the abrupt scene cut instantaneously and abruptly varies from the negative maximum peak to the positive maximum peak, so the differential value of the Q value may be utilized for the abrupt scene cut detection.

$$Pr(H_n) \gg Pr(H_d) \quad (41)$$

$$Pr(H_n) = Pr(H_d) \quad (42)$$

Figure 4:
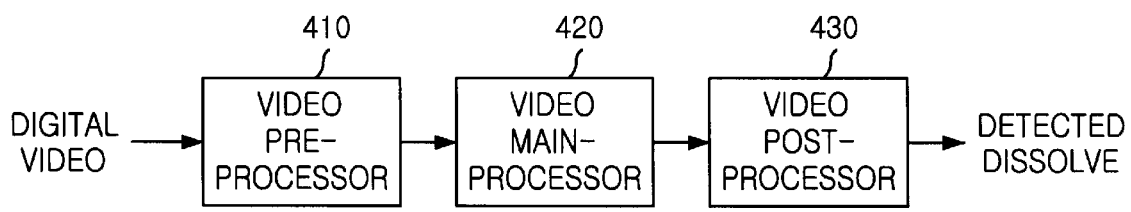
FIG. 4 is a schematic view for showing a real-time gradual scene change detector having a high precision according to an embodiment of the present invention.

FIG. 4 is a schematic view for showing a real-time gradual scene change detector having a high precision according to an embodiment of the present invention.

Referring to FIG. 4, the real-time gradual scene detector comprises a video pre-processor 410, a video main-processor and a video post-processor.

The video pre-processor 410 outputs a decoded DC image as a vector form into the main-processor 420 after the pre-processor 410 partially decodes the DC image sequence of the digital video inputted from the outside. Otherwise, the video pre-processor 410 can output the vector form into the main-processor 420 after the pre-processor 410 reduces the decoded DC image.

The video main-processor 420 temporarily declares the dissolve after the main-processor 420 receives the vectorized DC image by the video pre-processor 410, and then the video main-processor 420 detects the position of the start frame and the position of the end frame of the temporarily declared dissolve. At that time, the video main-processor 420 detects the positions where the start frame and the end frame of the temporarily declared dissolve exist among the entire frames of the vectorized DC image.

The detected values of the start frame and the end frame of the temporarily declared dissolve are transferred to the video post-processor 430.

The video post-processor 430 identifies whether the distance of the temporarily declared dissolve is smaller than the link threshold ($Th_{link}$) or not, and then declares the dissolves having small distances as one dissolve.

After the post-processor 430 declares the dissolve, the video post-processor 430 identifies whether the distance between the start frame and the end frame of the declared dissolve is small than the distance threshold ($Th_{dist}$) or not and whether the distance between the start frame and the end frame of the declared dissolve is small than the persistent duration threshold ($Th_{dur}$), and then the posy-processor 430 declares the dissolve. Otherwise, the video post-processor 430 does not the declared dissolve as one to be the dissolve.

If the distance between the dissolves temporarily declared by the main-processor 420 is not less than the merging threshold ($Th_{link}$), the video post-processor 430 identifies whether the distance between the start frame and the end frame of the dissolve temporarily declared by the main-processor 420 is bigger than the distance threshold ($Th_{dist}$) or not. Subsequently, the post-processor 430 identifies whether the distance between the start frame and the end frame of the dissolve is bigger than the persistent duration threshold ($Th_{dur}$) or not when the distance is bigger than the distance threshold ($Th_{dist}$), and then the post-processor 430 declares the distance to be the dissolve. As it is describes above, the video-postprocessor 430 does not declare the temporarily declared dissolve as the dissolve.

In this case, the distance threshold ($Th_{dist}$) is a criterion for discriminating that the temporarily declared dissolve or the distance between the start frame and the end frame is sufficiently large. After such conditions are satisfied, the persistent duration threshold ($Th_{dur}$) is utilized as a criterion for discriminating that the temporarily declared dissolve or the distance between the start frame and the end frame has a sufficiently large duration.

Figure 5:
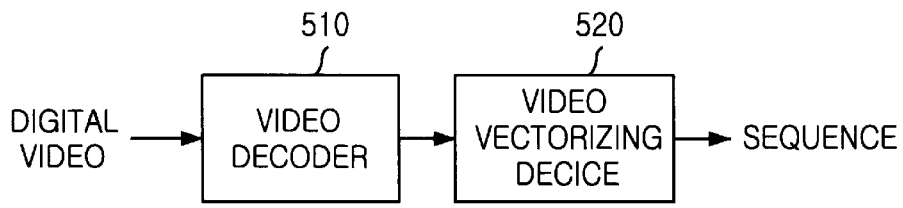
FIG. 5 is a detailed view for illustrating a video pre-processor in FIG. 4 according to an embodiment of the present invention.

FIG. 5 is a detailed view for illustrating a video pre-processor in FIG. 4 according to an embodiment of the present invention.

Referring to FIG. 5, the video pre-processor comprises a video decoder 510 and a video vectorizing device 520.

The video decoder 510 receives the digital video (for example, the MPEG, the MJPEG and the video stream), and then the video decoder 510 outputs the partially decoded the DC image sequence to the video vecterizing device 520 after the video decoder 510 decodes ($f_{DC,i}$) the DC image sequence of the digital video. The video decoder 510 converts the format of the video so as to use the digital video for the scene change detection (that is the video decoder 510 extracts the compressed image).

The video vectorizing device 520 transmits a concerned Dc image to the video main-processor 420 after vectorizing the concerned DC image of the decoded DC image or the video vectorizing device 520 projects the decoded DC image in the x-direction and the y-direction. Also, the video vectorizing device 520 accomplishes the vectorizing process after the video vectorizing device 520 reduces the data by subsampling in the diagonal direction.

In the vectorizing process, the projection process is accomplished according as one row vectors are extracted by averaging the images of the compressed domain (namely, the DC image sequence) after the images of the compressed domain are combined in the x-direction or in the y-direction (that is, the vertical direction).

In particular, the y-direction projection is expressed as the following mathematical expression (43).

$$p(x, i) = \text{round}\left(\frac{1}{n}\sum_{y=0}^{n-1} f_{DC}(x, y, i)\right) \quad (43)$$

Also, the x-direction projection is similar to the y-direction projection. In the mathematical expression (43), the round means the round up step so that the p(x, i) becomes an integer and m and n are the width and the length of the image, respectively. The row vector fi can be expressed according to the following mathematical expression (44).

$$f_i = \begin{bmatrix} p(0, i) \\ p(1, i) \\ \vdots \\ p(m-1, i) \end{bmatrix} \quad (44)$$

The row vector may be regarded as a kind of the projected image. Such projected image greatly maintains the characteristics of the moving picture (for example, the rough color information, the motion of the image, the abrupt scene change and the gradual scene change). When the characteristics of the moving picture can be easily observed when the projected image row vectors are combined to form one matrix (two-dimensional image) and the image (the band image) is observed.

The calculating time of the process can be accomplished more rapidly since the calculating time and the memory of the algorithm decrease as nearly '1/n' when the projected image is utilized.

In the visual rhythm made as the one row vector per an image by sub-sampling the diagonal ingredient of the DC image, the visual rhythm excellently shows the characteristics of the three-dimensional video, the advantage of the projected image sequence, as the two-dimensional image and the calculating process can be more rapidly accomplished because the decoding time reduces to about '1/n', however, the native information of the moving picture corresponding to the amount may be lost.

Figure 6:
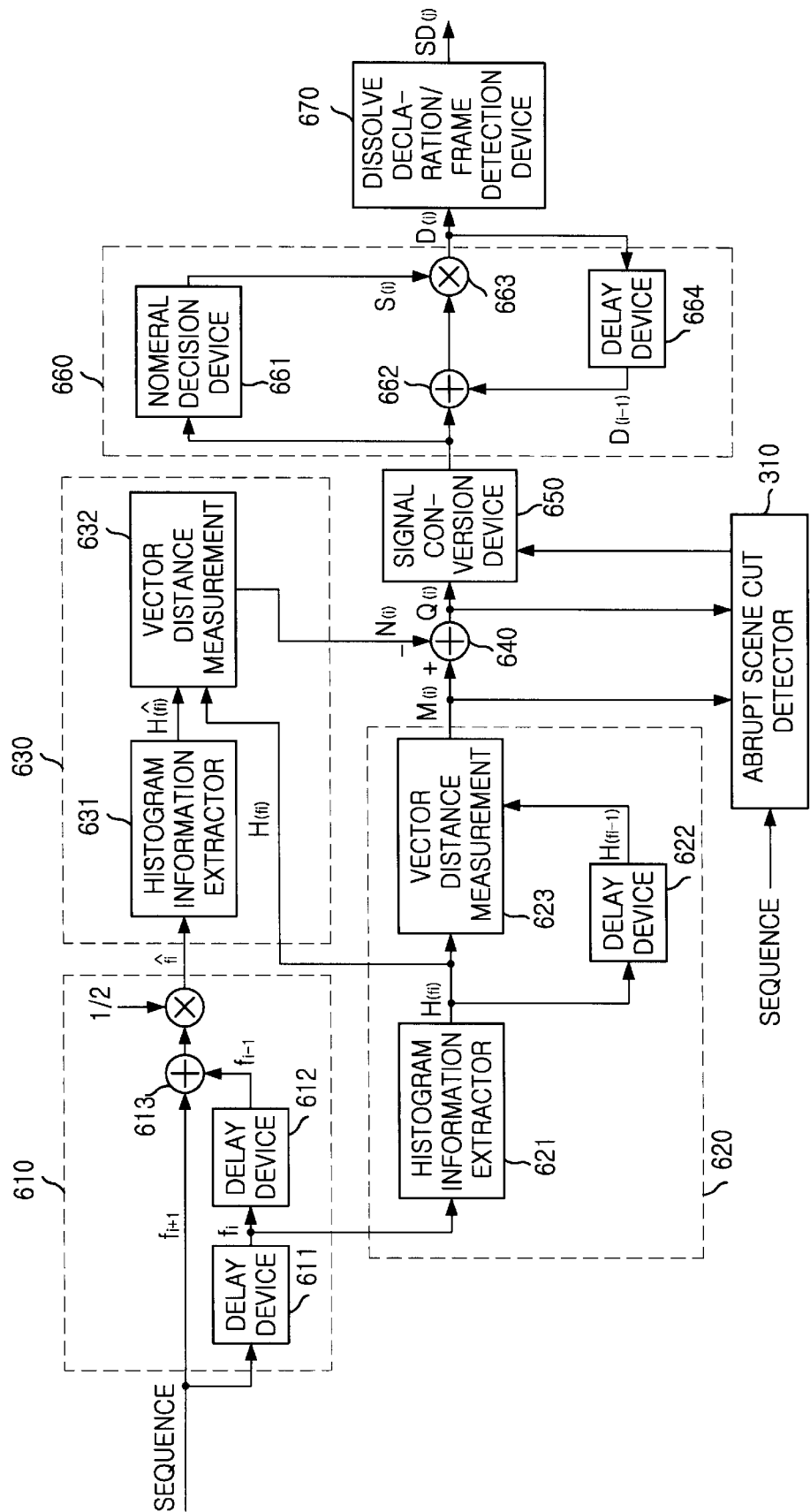
FIG. 6 is a detailed view for illustrating a video main-processor in FIG. 4 according to an embodiment of the present invention.

FIG. 6 is a detailed view for illustrating a video main-processor in FIG. 4 according to an embodiment of the present invention.

As shown in FIG. 6, the video main-processor comprises a linear image prediction device 610, a first frame distance measurement device 620, a second frame distance measurement device 630, an adder 640, a signal conversion decision device 650, an accumulation device 660 and a frame declaration/frame detection device 670.

The linear image prediction device 610 predicts the $\hat{f}_i$ which is most near the $f_{i+1}$ by using the $f_{i-1}$ and the $f_{i+1}$ of the vectorized DC image.

The first frame distance measurement device 620 measures the distance between the frames of the $f_{i-1}$ and the $f_i$ after the first distance measurement device 620 receives the delayed $f_i$ from the linear image prediction device 610.

The second frame distance measurement device 630 measures the distance between the frames of the $f_{i-1}$ and $f_i$ the after the second frame distance measurement device 630 receives the linearly predicted $\hat{f}_i$ by the linear image orediction device 610.

The adder 640 calculates the difference between the distances of the M(i) and the N(i) measured by the first frame distance measurement device 620 and the second frame distance measurement device 630.

The signal conversion decision device 650 discriminates whether the difference value Q(i) of the adder 640 is directly printed or the difference value Q(i) is printed after the difference value Q(i) becomes '0' according to the abrupt scene cut detection of the abrupt scene change detection device 310.

The accumulation device 660 accumulates the difference values printed from the signal conversion decision device 650.

The dissolve declaration/frame detection device 670 declares the temporarily dissolve and detects the positions of the start frame and the end frame of the temporarily declared dissolve after it receives the accumulated value D(i) inputted from the accumulation device 660.

The linear prediction device 610 comprises a first delay device 611, a second delay device 612, an adder 613, and a multiplier 614.

The first delay device 611 delays the frame of the DC image sequence for a predetermined time and the second delay device 612 also delays the delayed frame for a predetermined time.

The adder 613 adds the $f_{i+1}$ of the vectorized Dc image and the delayed $f_{i-1}$ transferred through the second delay device 612.

The multiplier 614 multiplies the value of the adder 613 with the inputted '1/2'.

The first frame measurement device 620 comprises a histogram information extraction device 621, a delay device 622, a vector distance measurement device 623.

The histogram information extraction device 621 outputs the histogram information as a vector type after the histogram information extraction device 621 receives the delayed $f_i$ transferred from the first delay device 611. The delay device 622 delays the histogram information extracted by the histogram information device 621 for a predetermined time.

The vector distance measurement device 623 measures the distance between the histogram information H($f_i$) and the delayed H($f_{i-1}$) transferred form the delay device 622. The second frame distance measurement device 630 comprises a histogram information extraction device 631 and a vector distance measurement device 632.

The histogram information extraction device 631 extracts the histogram information H($\hat{f}_i$) after histogram information extraction device 631 receives the linearly predicted $\hat{f}_i$ from the multiplier of the linear image prediction device 610.

The vector distance measurement 632 measures the distance between the vectors after it receives the histogram information H($\hat{f}_i$) extracted by the histogram information extraction device 631 and the histogram information H($f_i$) extracted by the histogram information extraction device 621 of the first frame distance measurement device 620.

The accumulation device 660 comprises a numerical discrimination device 661, an adder 662, a multiplier 663 and a delay device 664.

The numerical discrimination device 661 outputs the printed value of the signal conversion discrimination device 661 after the numerical discrimination device 661 decides the printed value as '0' or '1'.

The adder 662 adds the printed value of the signal conversion discrimination device 650 and the accumulated value D(i-1) corresponding the printed value.

The multiplier 663 outputs the accumulated value D(i) after it multiplies the numeral discriminated by the numerical discrimination device 661 with the added value of the adder 662.

The delay device 664 transfers the accumulated value D(i-1) to the adder 662 after the delay device 664 delays the accumulated value multiplied by the multiplier 663 for a predetermined time. At that time, the accumulation device 660 outputs '0' when the '0' is outputted from the signal conversion discrimination device 650.

When the abrupt scene change detector 310 does not detects the abrupt scene change, the signal conversion discrimination device 650 directly transmits the difference Q(i) of the adder 640 to the accumulation device 660. Subsequently, after the accumulation device 660 accumulates the difference Q(i) the accumulation device 660 outputs the difference Q(i) into the dissolve declaration/frame detection device 670.

In case that the difference Q(i) is outputted by the accumulation device 660, the dissolve declaration/frame detection device 670 declares the temporary dissolve after the dissolve declaration/frame detection device 670 receives the accumulated value D(i), and then the dissolve declaration/frame detection device 670 detects the positions of the start frame and the end frame of the temporarily declared dissolve. At that time, the dissolve declaration/frame detection device 670 identifies whether the maximum value of the accumulated value D(i) in the duration which is bigger than '0' is bigger than the duration threshold (Th$_{CLD}$) among the accumulated values. Then the dissolve declaration/frame detection device 670 finds the accumulated value larger than the duration threshold (Th$_{CLD}$) and identifies whether the duration of the found D(i) is bigger than the continuous threshold (Th$_{CON}$) or not. When the duration of the found D(i) is bigger than the continuous threshold (Th$_{CON}$), the dissolve declaration/frame detection device 670 declares the duration of the found D(i) as the dissolve and detects the positions of the start frame and the end frame of the temporarily declared dissolve. Otherwise, the dissolve declaration/frame detection device 670 does not declare the dissolve.

If the abrupt scene change detector detects the abrupt scene change, the signal conversion discrimination device 650 converts the difference value of the adder 640 into '0' and transmits to the accumulation device 660. Then, the accumulation device 660 outputs the '0' into the dissolve declaration/frame detection device 670. Hence, the dissolve declaration/frame detection device 670 cannot declare the temporary dissolve.

As it is described above, the dissolve declaration/frame detection device 670 cannot declare the temporary dissolve by adjusting the difference value Q(i) of the adder 640 as '0' since the error may occurs in case of the dissolve declaration in the abrupt scene change. That is, the false-alarm can be reduced.

The abrupt scene cut detector 310 detects the abrupt scene cut after the abrupt scene cut detector 310 receives the difference value Q(i) of the adder and the measured value M(i) of the first frame distance measurement device 620.

In general, the false-alarm can be reduced by observing the continuous value of the Q (that is, the pattern of the continuous amount in the gradual scene change) since the gradual scene change has the continuity that the duration of the dissolve N has a length of about 4 to 5 frames and the gradual scene change may not be discriminated by the instantaneous Q value. Therefore, the accumulated value D(i) is defined as the following mathematical expression (45) in order to observe the continuity and the probability of the gradual scene change.

$$D(i) \triangleq S(i)*[D(i-1)+Q(i)], \text{ for } i \geq 1 \quad (45)$$

wherein the S(i) meets the condition of the following mathematical expression (46).

$$S(i) = \begin{bmatrix} 1, & Q(i) > 0, & D(0) = 0 \\ 0, & Q(i) \leq 0 \end{bmatrix} \quad (46)$$

The accumulated value function D(i) of the accumulation device 660 having the above condition roughly shows two patterns in the gradual scene change. The D(i) is expressed as the monotonous increment function having the local length in the D(i) When the value of the continuous amount of the Q(i) is sufficiently long. The D(i) is declared as the temporary gradual scene change (for example, jth suspected dissolve SD(j)) when the partial maximum value of the D(i) is sufficiently high. That is, when the partial maximum value of the D(i) is bigger than the duration threshold ($Th_{CLD}$), equal to the partial length of the Q(i), and is bigger than the continuous threshold ($Th_{CON}$), the jth temporary scene change decides the start frame of the continuous amount value of the Q(i) as the start frame of the temporarily declared dissolve and the end frame of the continuous amount value of the Q(i) as the start frame of the temporarily declared dissolve. Such process can be expressed the following mathematical expression (47).

$$SD(j) = \begin{bmatrix} SD(j, \text{start}) \\ SD(j, \text{end}) \end{bmatrix} \quad (47)$$

The SD(j,start) is the j-th position of the start frame of a temporary declared dissolve, SD(j,"end") is the j-th position of the end frame of a temporary declared dissolve.

Figure 7:
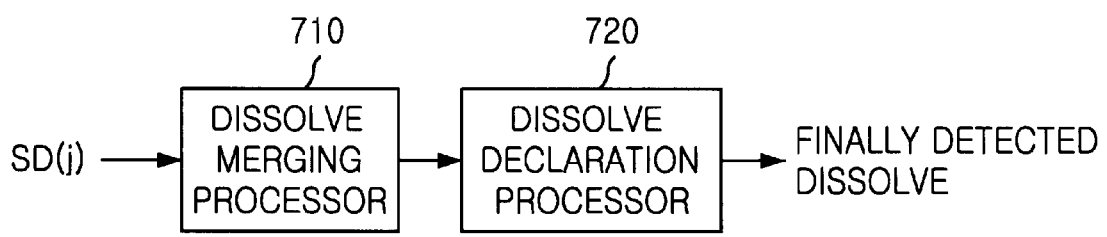
FIG. 7 is a detailed view for illustrating a video post-processor in FIG. 4 according to an embodiment of the present invention.

FIG. 7 is a detailed view for illustrating a video post-processor in FIG. 4 according to one embodiment of the present invention. Referring to FIG. 1, the video post-processor comprises a dissolve merging processor 710 and a dissolve declaration processor 720.

The dissolve merging processor 710 discriminates whether the distance of the dissolve, which is temporarily declared in a video main-processor 420, is less than the link threshold ($Th_{link}$). If the distant is less than the link threshold, the dissolve merging processor 710 merges dissolves with small distance into a dissolve.

The dissolve declaration processor 720 discriminates whether the distance, between the start frame and the end frame of the dissolve merged as one by a dissolve merging processor 710, is greater than the distance threshold ($Th_{dist}$) If the distance is greater than the distance threshold, the dissolve declaration processor 720 discriminate whether the distance, between the start frame and the end frame of the dissolve declared as a dissolve in a total frame, is greater than the duration threshold ($Th_{dur}$). If the distance is greater than the duration threshold, the dissolve declaration processor 720 declares it a dissolve. If the conditions are not satisfied, a dissolve merging processor 710 does not declare the dissolve, which is merged as one by a dissolve merging processor 710, a dissolve.

If the distance of dissolves, which is temporarily declared in video main-processor 420, is not less than the link threshold ($Th_{link}$), the dissolve merging processor 710 transmit dissolves, which is temporarily declared in video main-processor 420, to the dissolve declaration processor 720. Then the dissolve declaration processor 720 discriminates whether the distance, between the start frame and the end frame of the temporarily declared dissolve which is transmitted through the dissolve merging processor 710, is greater than the distant threshold ($Th_{dist}$). If the distant is greater than the distant threshold, the dissolve declaration processor 720 discriminates whether the distance, between the start frame and the end frame of the dissolve which is temporarily declared in a total frame. If the distance is greater than the duration threshold, the dissolve declaration processor 720 declares it a dissolve. If the conditions are not satisfied, a dissolve declaration processor 720 does not declare the dissolve, which is temporarily declared by a video main-processor 420, a dissolve.

There is a problem that D(i) seems like the shape of the teeth of a saw in a very slow gradual scene change. To solve this problem, the dissolve merging processor 710 uses the link threshold ($Th_{link}$). If the distance of temporarily declared dissolves is small enough, the dissolve merging processor 710 connects temporarily deserved dissolves one another and perform the task to merge temporarily deserved dissolves into a dissolve.

The k-th combined temporarily declared dissolve (LSD (k)) increases the j of SD(j). If the following mathematical expression 48 is satisfied, the k-th combined temporarily declared dissolve repeatedly resets the start frame of the present temporary scene change by the following mathematical expression 49.

$$[SD(j+1, \text{start})-SD(j, \text{end})] \leq Th_{link} \quad (48)$$

$$SD(j+1, \text{start}) = SD(j, \text{start}) \quad (49)$$

The SD(j), when the following mathematical expression 50 is satisfied, is declared as the k-th LSD(k).

$$[SD(j+1, \text{start})-SD(j, \text{end})] \leq Th_{link} \quad (50)$$

The k-th connected gradual scene change LSD(k), which is determined by a dissolve merging processor 710, is expressed as the following mathematical expression 51.

$$LSD(k) = \begin{bmatrix} LSD(k, \text{start}) \\ LSD(k, \text{end}) \end{bmatrix} \quad (50)$$

LSD(k,start) is the position of the start frame of the k-th combined temporarily dissolve, "LSD(k,end)" is the position of the end frame of the k-th combined temporarily dissolve.

To remove the false-alarm, the dissolve declaration processor 720 uses the distant measurement method which is less sensitive to the overall brightness change of the image. If the distance between the start frame and the end frame of the LSD(k) (the k-th combined temporarily declared dissolve) is long enough, and the distance of LSD(k) is long enough, the dissolve declaration processor 720 performs the task to declare the distance, between the start frame and the end frame, a dissolve.

If the following mathematical expression 52 and 53 are satisfied, the dissolve declaration processor 720 finally declares LSD(k) the k-th gradual scene change.

"LSD(k, end)"

$$d_3(f_{LSD(k,start)}, f_{LSD(k,end)}) > Th_{dist} \quad (52)$$

$$LSD(k,\text{end}) - LSD(k,\text{start}) + 1 \geq Th_{dur} \quad (53)$$

As it is described above, the present invention tests much video clips having the dissolves so that detects the dissolve concerning the DC image extracted from the MPEG sequence and the projected image sequence or the subsampling image sequence.

In the meantime, the present invention is simulated by using the global threshold about all the Dc images such as $Th_{CLD}=90*30/3$, $Th_{link}=3$, $Th_{dur}=5$ and $Th_{dist}=800$ at the video main-processor 420 and the video post-processor 430.

In case of utilizing the conventional algorithm, the simulation image successfully detects not only the short dissolves having the motion of the object in the image and the predetermined motion of the camera after selecting the moving pictures hardly detected, but also most gradual scene changes concerning various advertisement sequences having several mixed moving picture effects such as the wipe and the abrupt scene cut without the missed-detection or the false-alarm.

Figure 8:
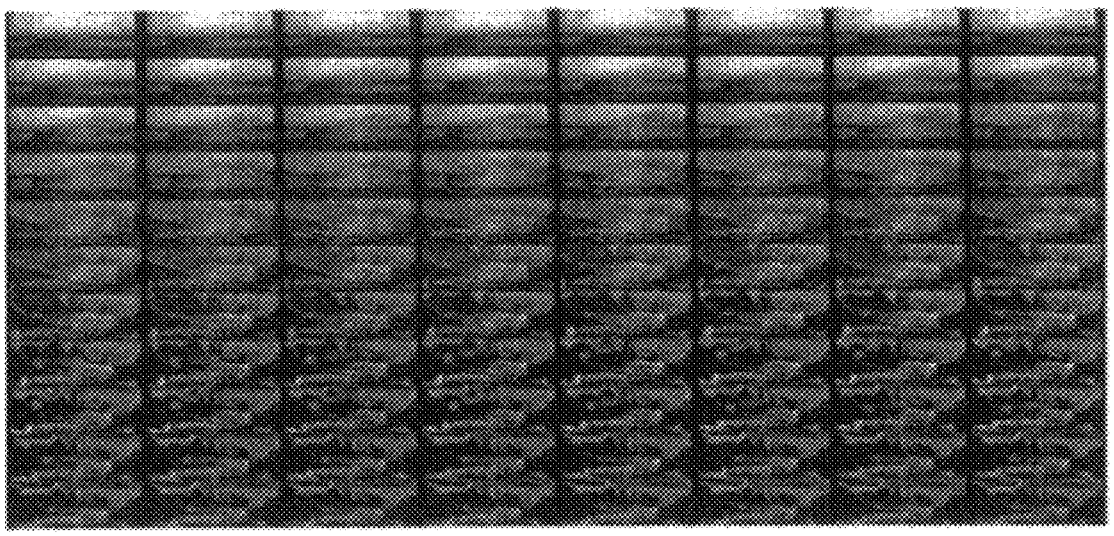
FIG. 8 is an example view for illustrating a first sequence concerning a gradual scene change detector according to an embodiment of the present invention.

FIG. 8 is an example view for illustrating a first sequence concerning a gradual scene change detector according to an embodiment of the present invention.

Referring to FIG. 8, the characteristics of the dissolves of 49 frames having length of from 15 to 63 among the sequence of 88 frames are expressed. In FIG. 8, the dissolve locates from about 15th to 63rd frames of the sequence having the partially vertical tilting of the camera.

Figure 9:
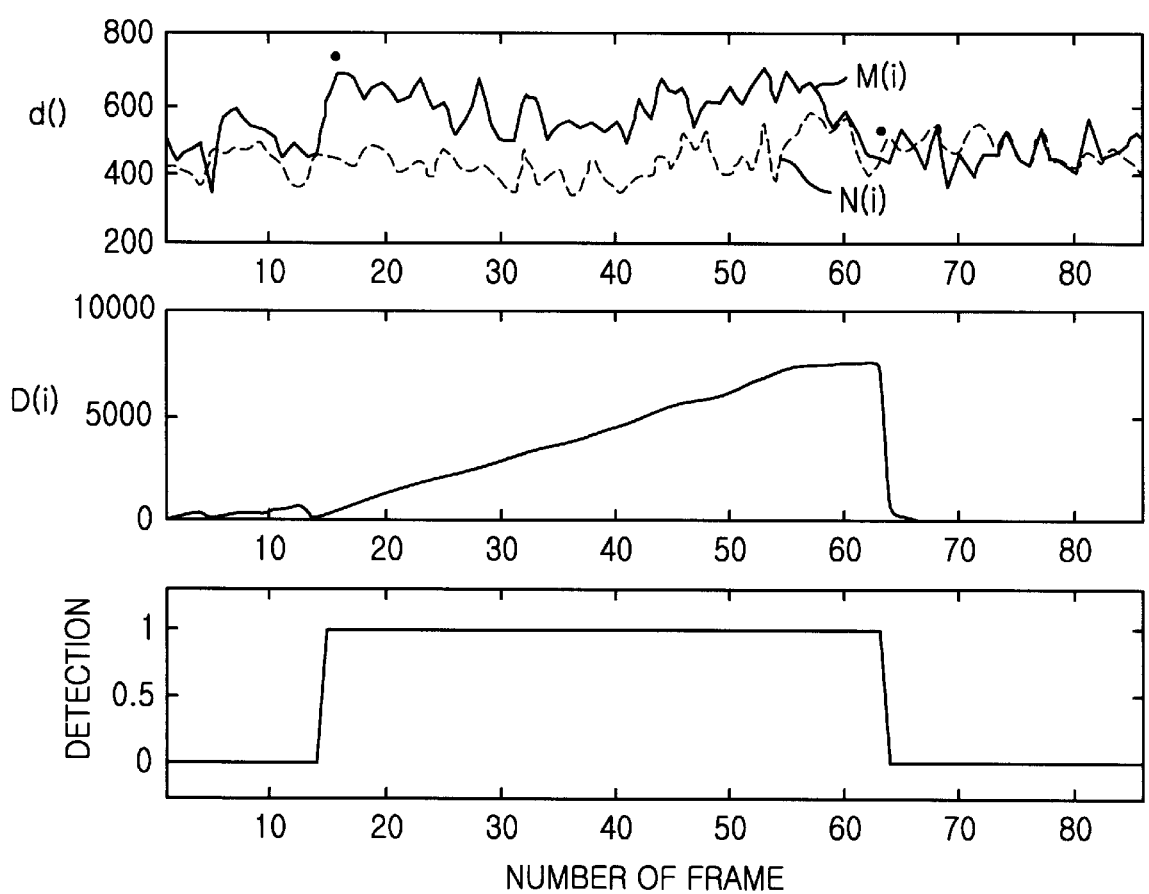
FIG. 9 is a characteristic view for illustrating a simulation result about the first sequence according to an embodiment of the present invention.

FIG. 9 is a characteristic view for illustrating a simulation result about the first sequence according to an embodiment of the present invention.

Referring to FIG. 9, the scene cut is accurately detected. In the FIG. 9, the result of the simulation are explained as the horizontal axis is the number of the frame and the solid line means M(i) and the dotted line means N(i) in the subplot of the first low window. The '0' on the graph means the start point of finally declared dissolve, '•' means the end point of finally declared dissolve. The subplot of the second low window represents the value of the D(i), the subplot of the third low window represents the detected value of the temporarily declared dissolve which is discriminated, the subplot of the fourth low window means the temporarily declared dissolve which is connected, and the subplot of the fifth low-window means the finally declared dissolve.

If the result of the lower 3 to 5 windows is the same, the lower 4 or 5 window was omitted because the result of the lower window 3 to 5 is the same in most case, which means that most sequences are detected without post-processing.

Figure 10:
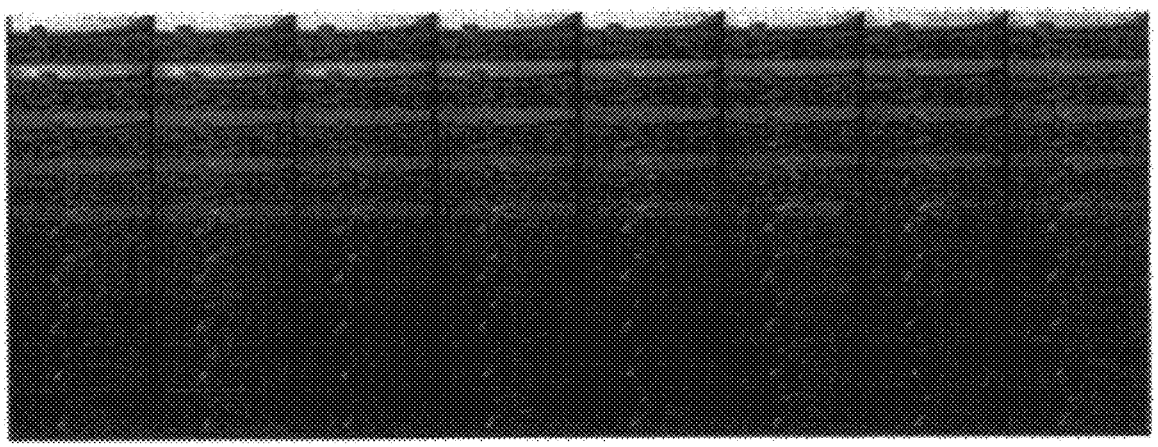
FIG. 10 is an example view for illustrating a second sequence concerning the gradual scene change detector according to an embodiment of the present invention.

The following is about the sequence which requires being processed by a dissolve merging processor 710 in video post processor 430, and about a second sequence with a horizontal pan of a camera in FIG. 10.

FIG. 10 is an example view for illustrating a second sequence concerning the gradual scene detector according to an embodiment of the present invention, and shows the characteristic of a 56 frame-length dissolve between the tenth frame and the sixty fifth frame in 72 frames sequence. FIG. 10 shows that a dissolve appears for about 2 seconds between the tenth frame and the sixty-third frame.

Figure 11:
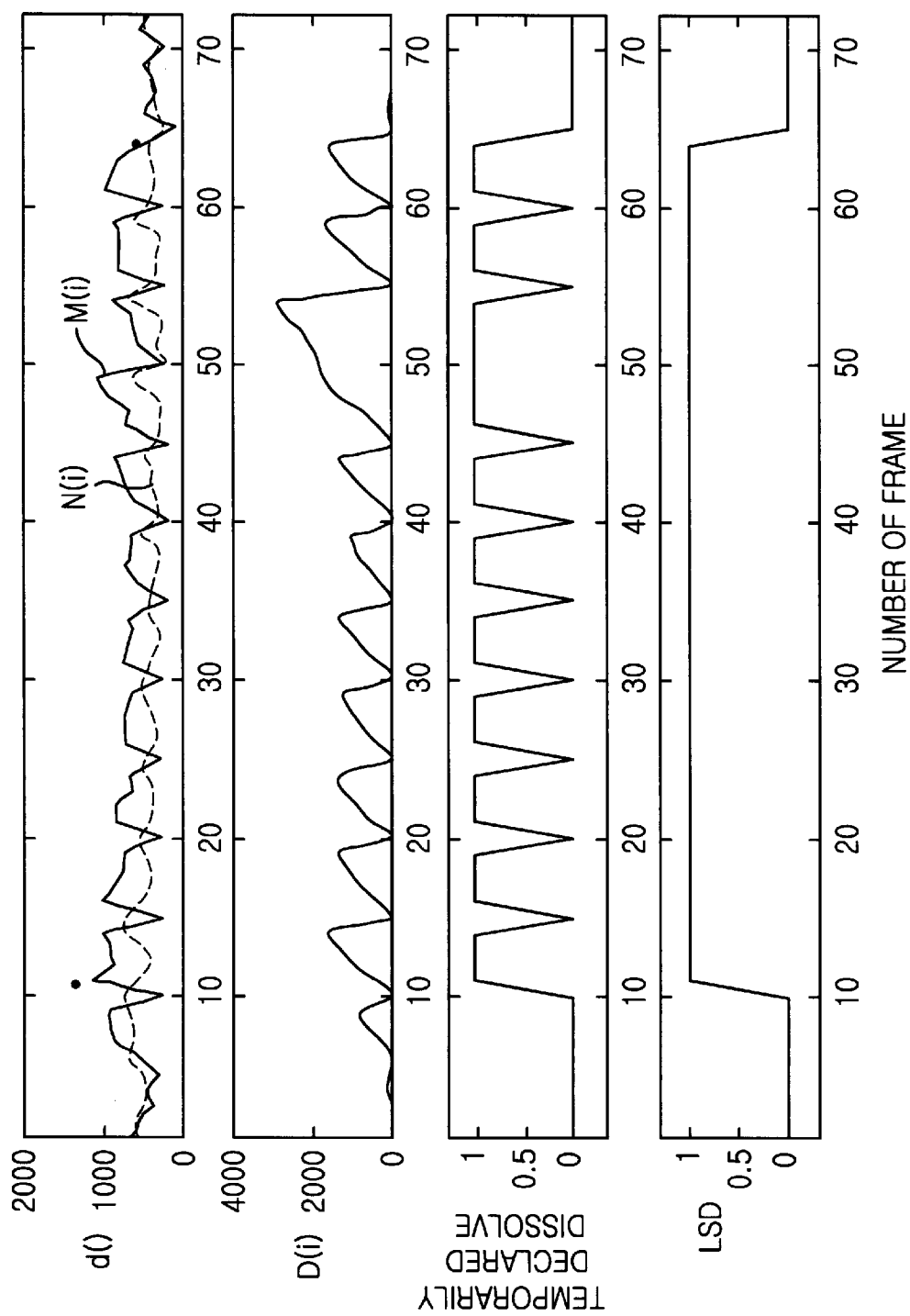
FIG. 11 is a characteristic view for illustrating a simulation result about the second sequence according to an embodiment of the present invention.

FIG. 11 is a characteristic view for illustrating a simulation result about the second sequence according to an embodiment of the present invention, a dissolve does not appear so fast that the result of D(i) is appeared as the shape of the teeth of a saw. Therefore, the sequence is merged to a dissolve though a dissolve merging processor 710 after the sequence is detected by a temporarily declared dissolve.

Figure 12:
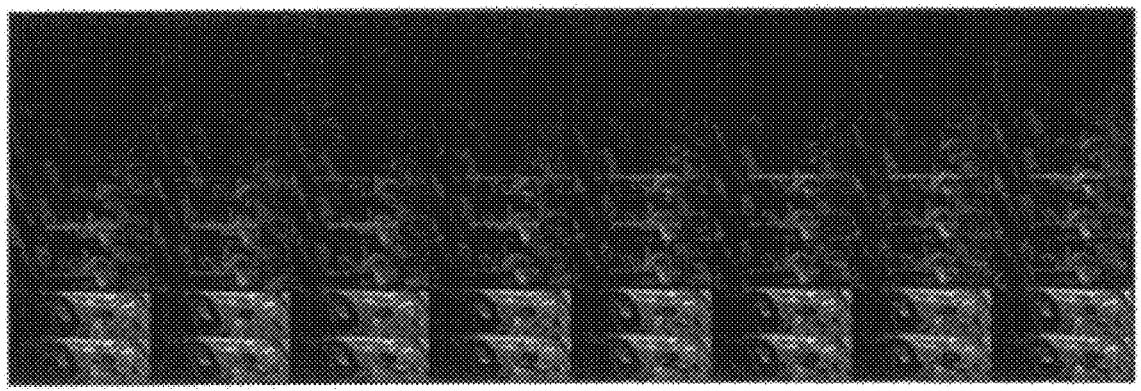
FIG. 12 is an example view for illustrating a third sequence concerning the gradual scene change detector according to an embodiment of the present invention.

FIG. 12 is an example view for illustrating a third sequence concerning the gradual scene change detector according to an embodiment of the present invention, and shows the characteristic of 29 frame-length dissolve between the third frame and the thirty-first frame in 64 frames sequence. FIG. 12 shows a sequence with a fade-in of 29 frame-length between the third image and the thirty-first image (the second image from the end of the fifth row), the camera moving toward 7 o'clock direction, and the forty-ninth image includes an abrupt scene change.

Figure 13:
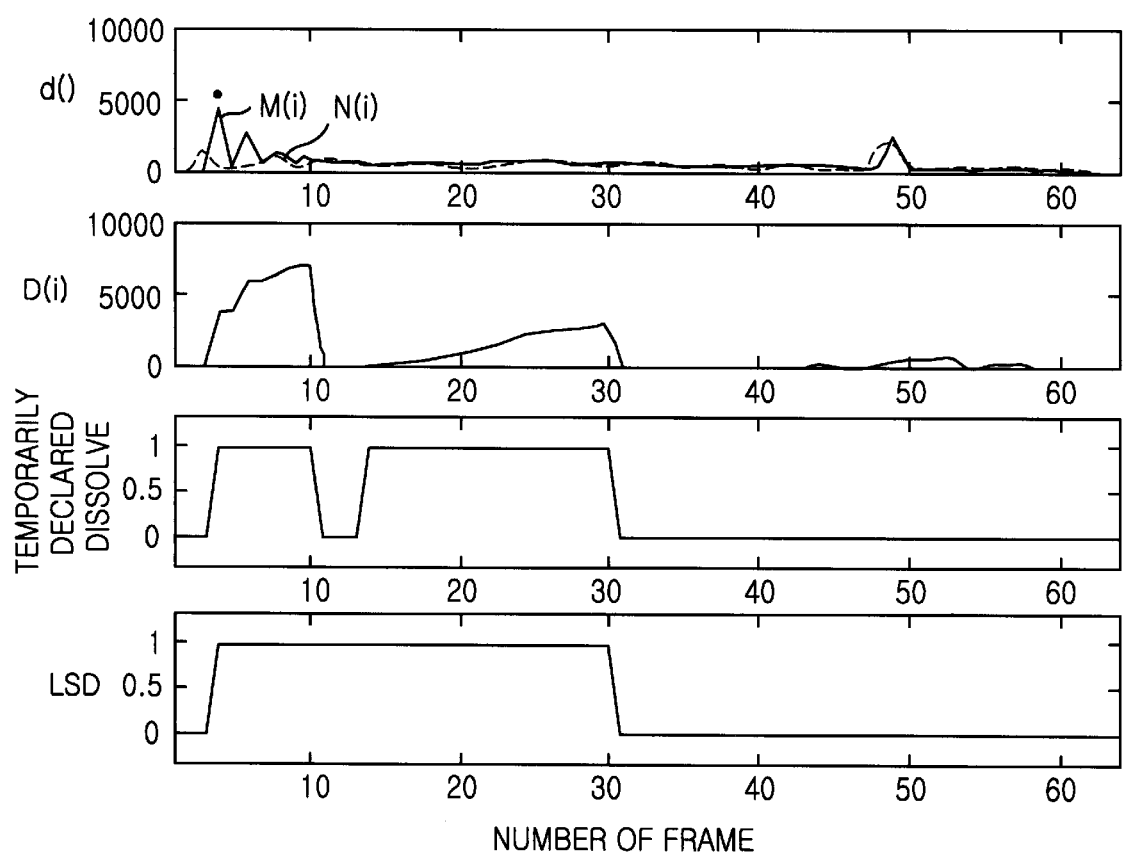
FIG. 13 is a characteristic view for illustrating a simulation result about the third sequence according to an embodiment of the present invention.

FIG. 13 is a characteristic view for illustrating a simulation result about the third sequence according to an embodiment of the present invention, the sequence is also merged to a dissolve though a dissolve merging processor 710 because the result of D(i) is appeared as the shape of the teeth of a saw like FIG. 11.

The following is the case of two gradual scene changes of pan and zoom namely the case of many motions.

Figure 14:
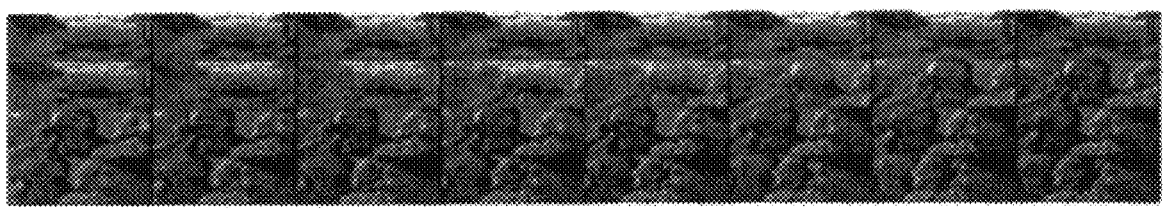
FIG. 14 is an example view for illustrating a fourth sequence concerning the gradual scene change detector according to an embodiment of the present invention.

FIG. 14 is an example view for illustrating a fourth sequence concerning the gradual scene cut detector according to an embodiment of the present invention, and shows the characteristic of 8 frame-length dissolve between the eight frame and the fifteenth frame in 32 frames sequence. FIG. 14 shows a dissolve sequence with 8 frame-length between the eighth image(the end image of the forth row) and the fifteenth image(the second image from the end of the second row), with a fast horizontal pan of a camera.

Figure 15:
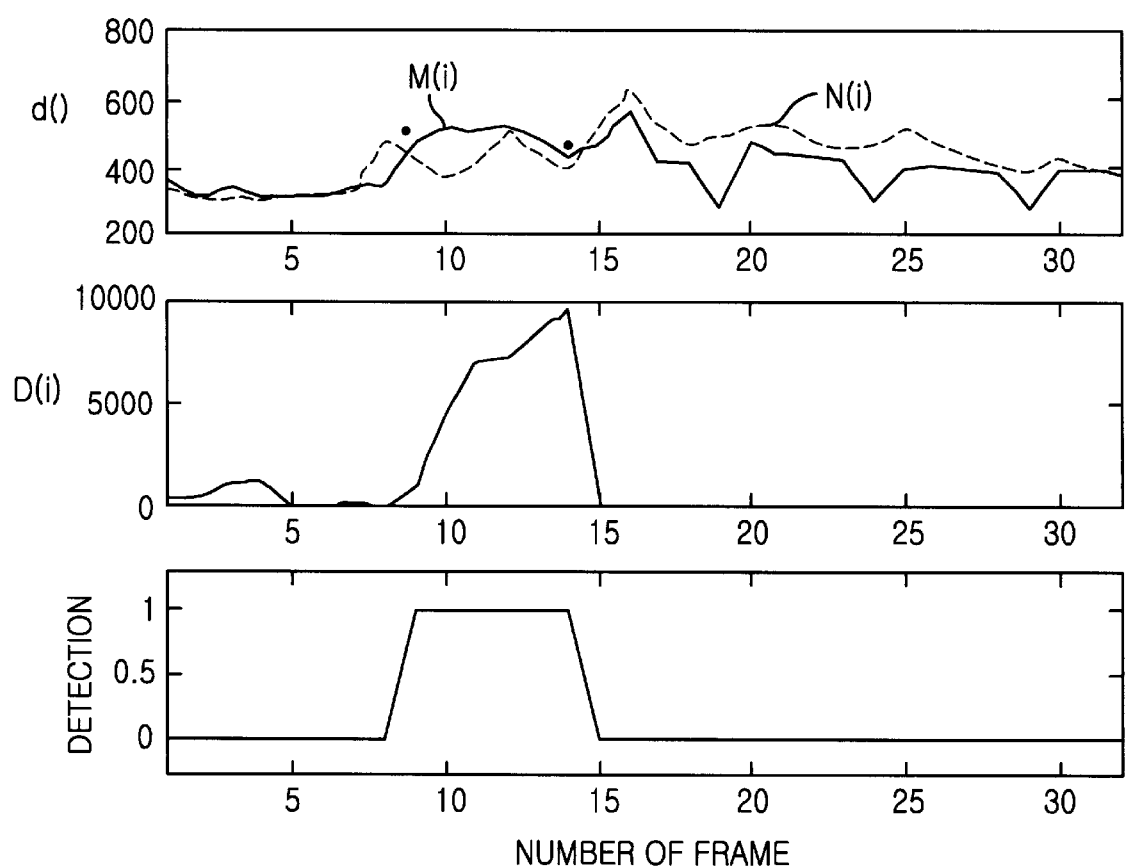
FIG. 15 is a characteristic view for illustrating a simulation result about the fourth sequence according to an embodiment of the present invention.

FIG. 15 is a characteristic view for illustrating a simulation result about the fourth sequence in the FIG. 14, and shows an exact detection result.

Figure 16:
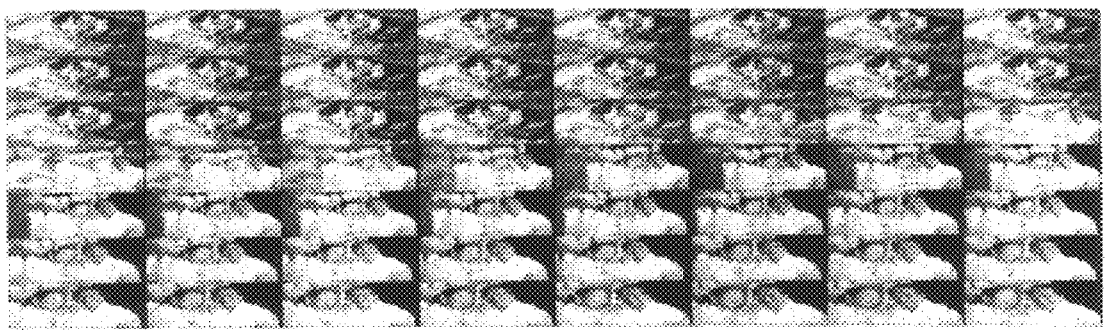
FIG. 16 is an example view for illustrating a fifth sequence concerning the gradual scene change detector according to an embodiment of the present invention.

FIG. 16 is an example view for illustrating a fifth sequence concerning the gradual scene cut detector according to an embodiment of the present invention, and shows the characteristic of 12 frame-length dissolve between the twentieth frame and the thirty-first frame in 56 frames sequence. FIG. 16 shows a dissolve sequence with 12 frame-length between the twentieth image(the fourth image of the forth row) and the thirty-fifth image(the second image from the end of the fourth row), and shows a zoom-in of a camera.

Figure 17:
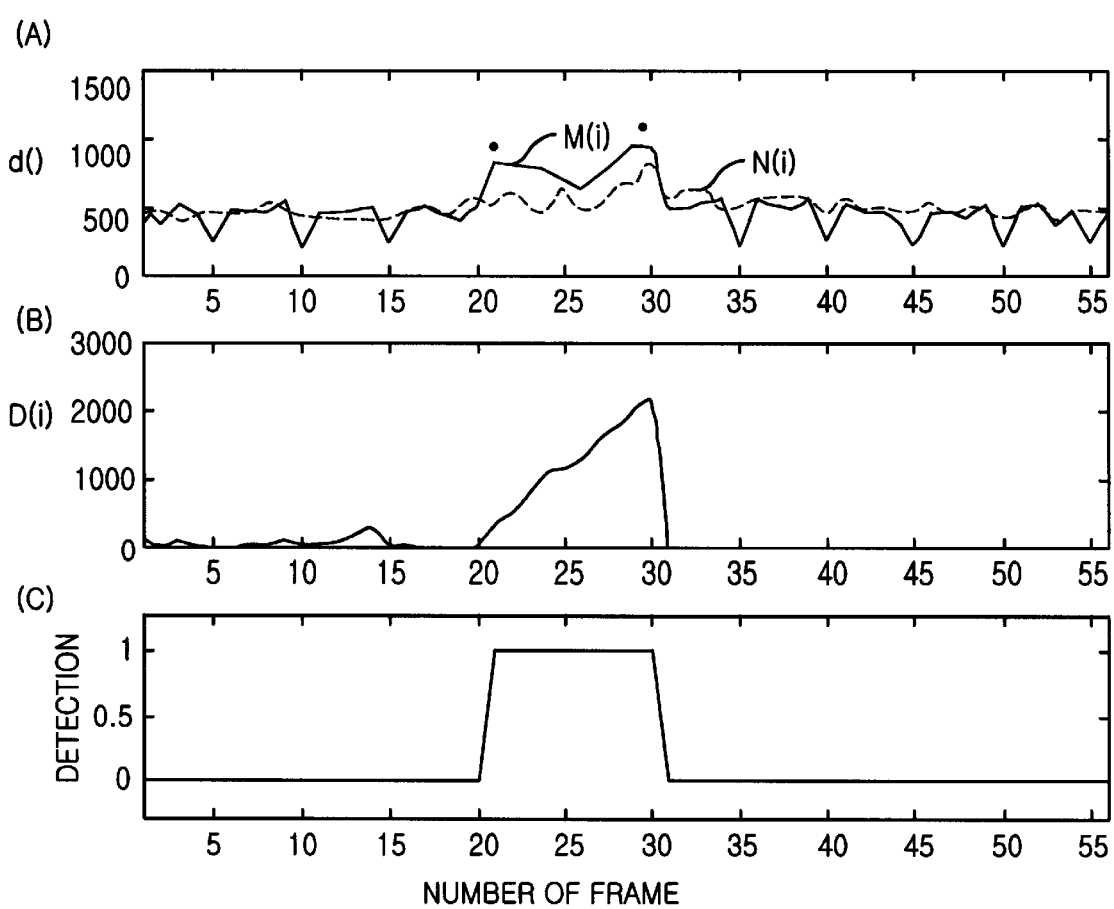
FIG. 17 is a characteristic view for illustrating a simulation result about the fifth sequence according to an embodiment of the present invention.

FIG. 17 is a characteristic view for illustrating a simulation result about the fifth sequence according to the FIG. 16, and shows an exact detection result.

Figure 18:
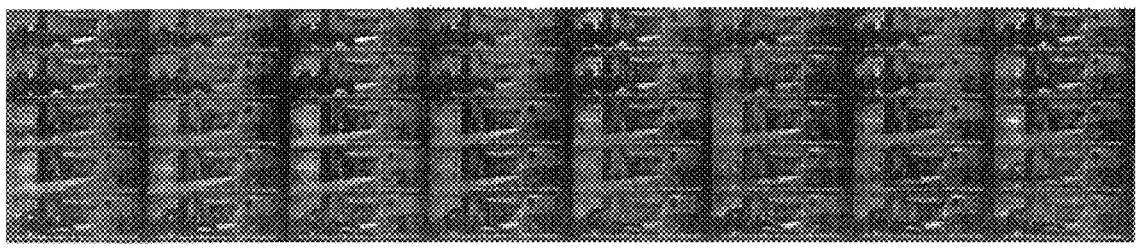
FIG. 18 is an example view for illustrating a sixth sequence concerning the gradual scene change detector according to an embodiment of the present invention.

FIG. 18 is an example view for illustrating the sixth sequence concerning the gradual scene cut detector according to an embodiment of the present invention, and shows the characteristic of the sequence with both a 10 frame-length dissolve between the twelfth frame and the twenty-first frame in 40 frames sequence and a 13 frame-length dissolve between the twenty-sixth frame and the thirty-eighth frame. FIG. 18 shows two dissolves with similar pattern, the first has 10 frame-length dissolve between the twelfth image(the fourth image of the second row) and the twenty-first image(the fifth image of the third row), and the second has 13 frame-length dissolve between the twenty-sixth image(the second image of the fourth row) and the thirty-eight image(the third image from the end of the fifth row).

Figure 19:
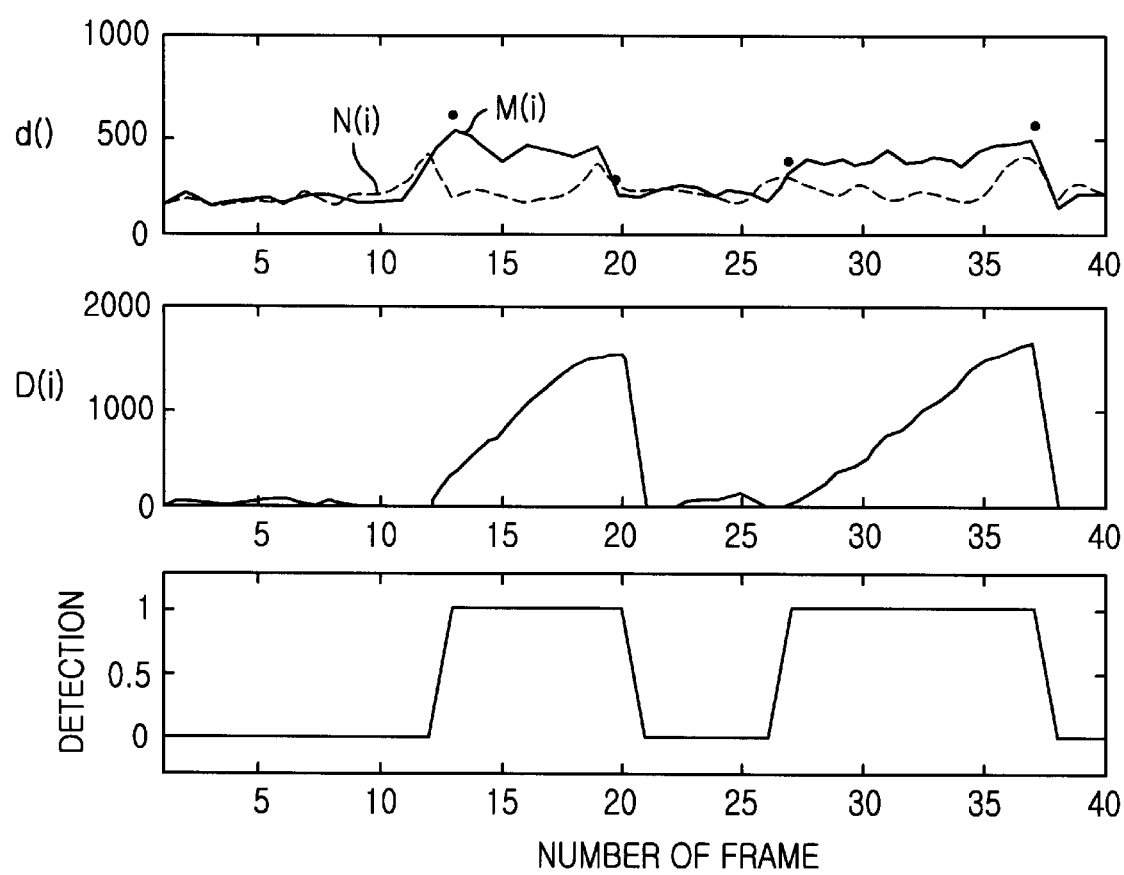
FIG. 19 is a characteristic view for illustrating a simulation result about the sixth sequence according to an embodiment of the present invention.

FIG. 19 is a characteristic view for illustrating a simulation result about the sixth sequence according to the FIG. 18.

Figure 20:
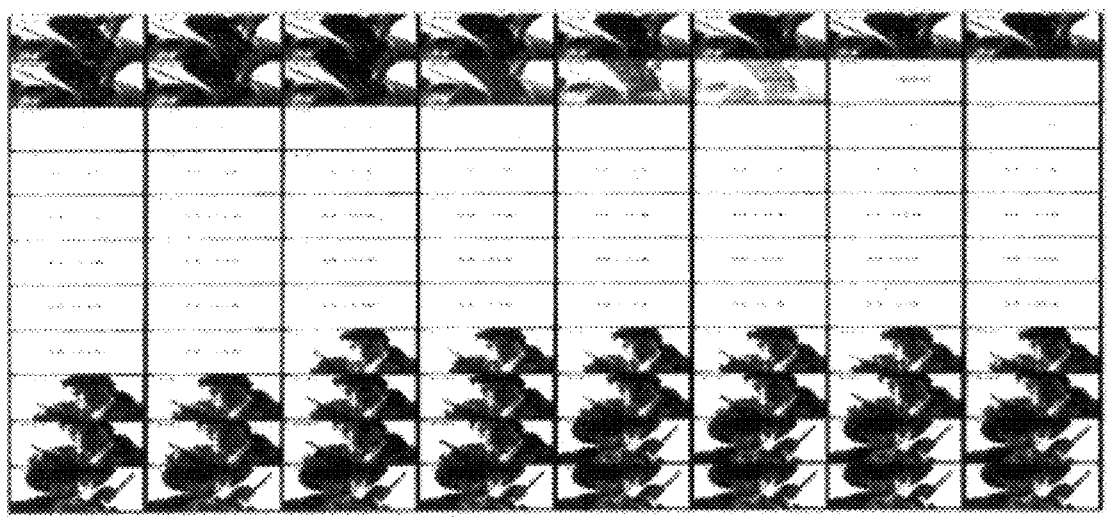
FIG. 20 is an example view for illustrating a seventh sequence concerning the gradual scene change detector according to an embodiment of the present invention.

FIG. 20 is an example view for illustrating a seventh sequence concerning the gradual scene change detector according to an embodiment of the present invention, and shows the characteristic of the sequence with a 23 frame-length dissolve between the tenth frame and the thirty-second frame in 88 frames sequence and 13 frame-length linear pattern between the sixtieth frame and seventy-second frame. FIG. 20 shows not only a dissolve but also a special sequence, not a dissolve like the model of the expression 40, with a consecutive linear pattern. The dissolve is actually 23 frame-length between the tenth image (the second image of the second row) and the thirty-second image (the end image of the fourth row).

However, the overall brightness from the sixtieth image (the fourth image of the eighth row) to the seventy-second image (the third image from the end of the ninth row) gets darker little by little. Therefore, this pattern detected by a temporary declared dissolve, a false-alarm is able to be removed because the distance ($d_3(\ )$) between the sixty-first image and the seventy-first image is less than the critical distant value ($Th_{dist}$) when the distance is measured through a dissolve declaration processor 720.

Figure 21:
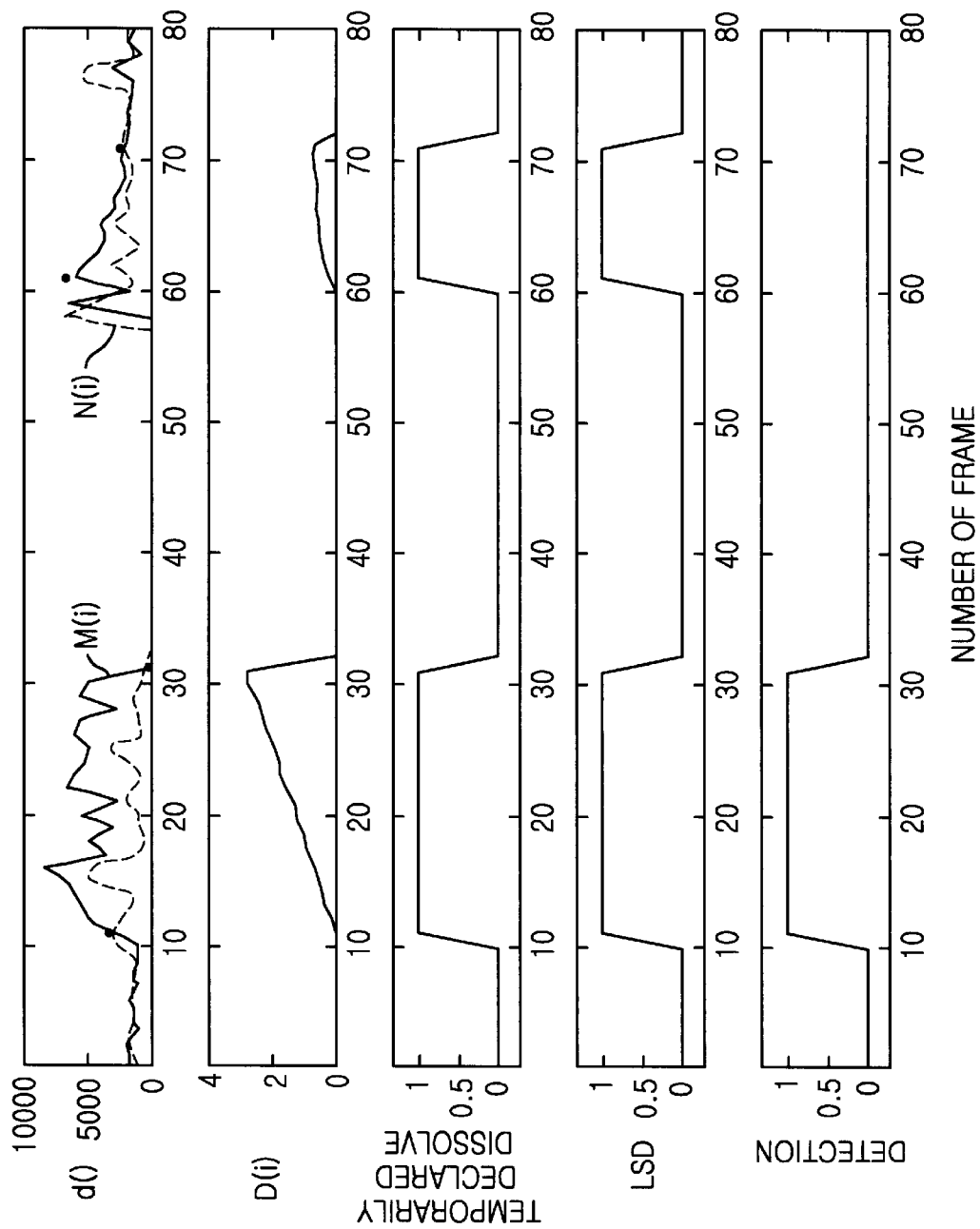
FIG. 21 is a characteristic view for illustrating a simulation result about the seventh sequence according to an embodiment of the present invention.
Figure 22:
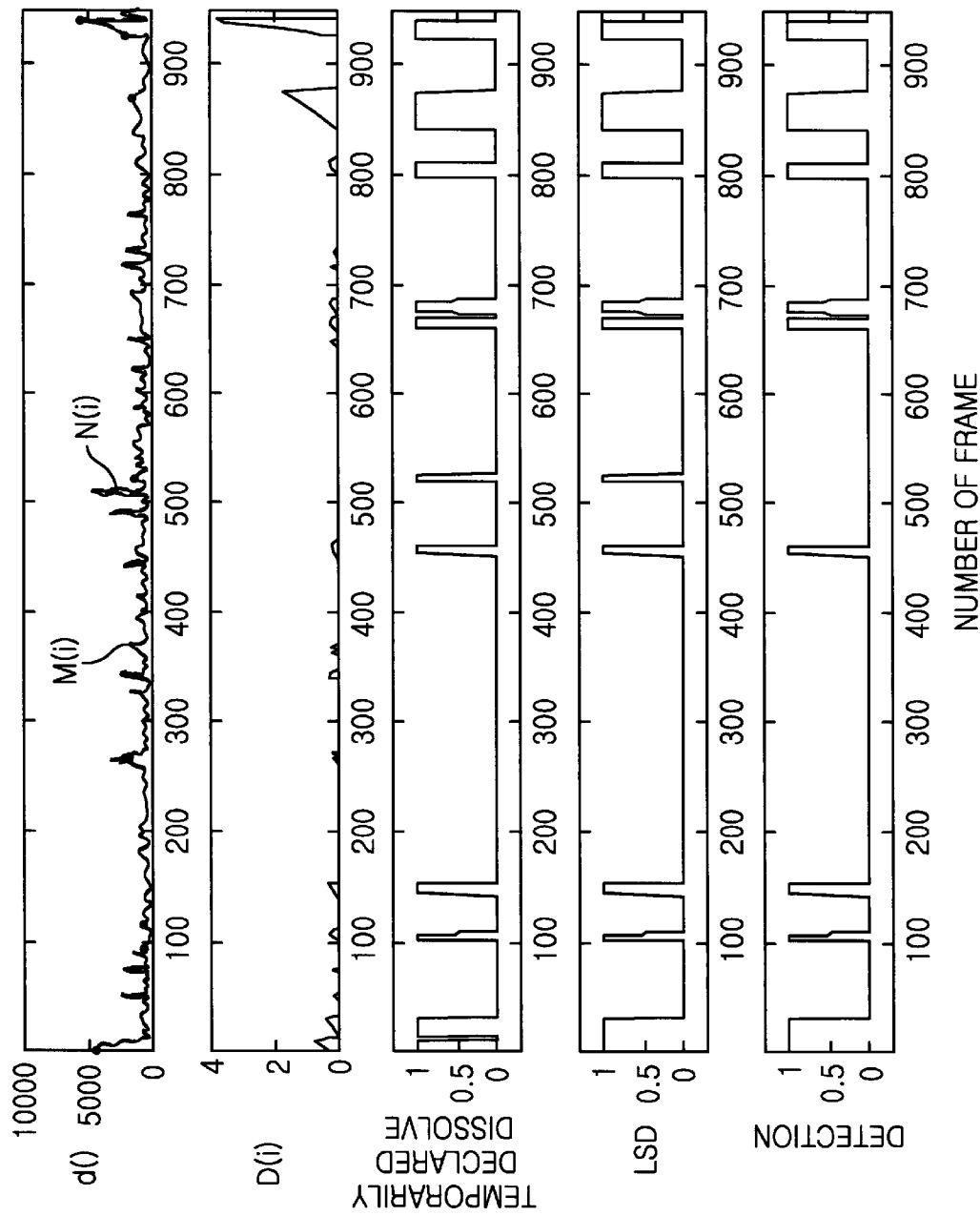
FIG. 22 is a characteristic view for illustrating a simulation result of an advertising sequence concerning the gradual scene change detector according the an embodiment of the present invention.

FIG. 21 is a characteristic view for illustrating a simulation result about the seventh sequence in FIG. 20 according to an embodiment of the present invention and FIG. 22 is a characteristic view for illustrating a simulation result of an advertising sequence concerning the gradual scene change detector according the an embodiment of the present invention. As show in FIG. 22, the simulation is accomplished for the advertisement sequence having relatively long length (951 frames require about 30 seconds). The entire image sequence may be omitted since the length of the image.

Figure 23:
FIG. 23 is an example view for illustrating a linear pattern sequence concerning the gradual scene change detector according to an embodiment of the present invention.

FIG. 23 is an example view for illustrating a linear pattern sequence concerning the gradual scene change detector according to an embodiment of the present invention.

Referring to FIG. 23, the gradual scene change detector 210 successfully detects 11 pieces of the suspected dissolve (SD) which is suspected by the video main processor 420, 10 pieces of the linked suspected dissolve (LSD) which is linked by the dissolve merging processor 710 and 9 pieces of the final gradual scene changes.

Figure 24:
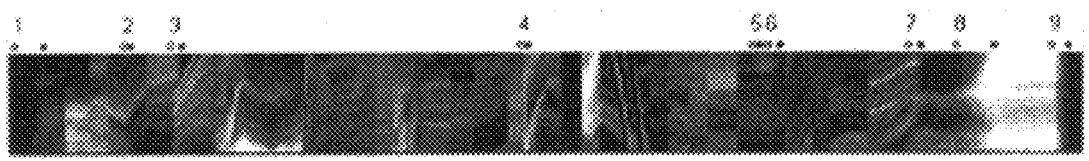
FIG. 24 is an example view for illustrating a dissolve detection result at the gradual scene change detector according to an embodiment of the present invention.

FIG. 24 is an example view for illustrating a dissolve detection result at the gradual scene change detector according to an embodiment of the present invention.

In FIG. 24, the result of the gradual scene change is expressed as the level numbers at the top of the band sequence of the projected image sequence according to the order of the time so as to compare the projected image sequence with the subsampled image sequence.

Figure 25:
FIG. 25 is an example view for illustrating a detection result concerning a projected image sequence at the gradual scene change detector according to an embodiment of the present invention.

FIG. 25 is an example view for illustrating a detection result concerning a projected image sequence at the gradual scene change detector according to an embodiment of the present invention.

As shown in FIG. 25, the gradual scene change detector of the present invention successfully detects the gradual scene change on the projected image sequence without a false-alarm.

Figure 26:
FIG. 26 is an example view for illustrating a detection result concerning a scanned image sequence at the gradual scene change detector according to an embodiment of the present invention.

FIG. 26 is an example view for illustrating a detection result concerning a scanned image sequence at the gradual scene change detector according to an embodiment of the present invention.

Referring to FIG. 26, the dissolve of the fourth image does not be detected. The dissolves of the fifth and sixth images show missed-detections since the dissolve patterns disappear during the scanned sequence. Hence, all the dissolves of the images can be detected besides the dissolve of the fourth image.

As it is described above, the gradual scene change detector has an excellent detection rate sufficiently meeting the demand of the user, so the gradual scene change detector can be widely used since the conventional image editor does not meet the user's requirement. The gradual scene change detector of the present invention can contribute to the field of the image edit because it has the excellent detection rate.

The gradual scene change detector can enhance the automatic video analysis device to develop more efficient video library and multi-media service. Also, the detector of the present invention can accomplish more convenient development and maintenance of the multi-media service. That is, the present invention can be utilized for various multi-media service such as a television service, a video on demanded, a remote lecture system, a home entertainment, an art gallery, a home banking, a home shopping, a geographical information system, an architecture design, an engineering design and so on.

Furthermore, the gradual scene change detector of the present invention can accurately detects the duration of the gradual scene change and executes the real-time processing.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A gradual scene change detector for detecting a gradual scene change, comprising:
   a video pre-processor for decoding an image sequence of a digital video signal externally applied, for vectorizing the image sequence of the digital video signal;
   a video main processor for determining a state of the image sequence based on a distance between frames of image sequence inputted from the video preprocessor so as to declare a temporal dissolve, and for detecting an initial frame position and a final frame position of the declared dissolve; and
   a video post-processor for merging the declared temporal dissolve in accordance with the distance between the declared temporal dissolves by the video main processor, and for declaring a dissolve based on the distance between the initial frame position and the final frame position and a duration.

2. The gradual scene change detector in accordance with claim 1, wherein the video pre-processor comprises:
   a video decoder for decoding an image sequence of the digital video signal; and
   a video vectorizor for converting the decoded image sequence from the video decoder into vector.

3. The gradual scene change detector in accordance with claim 2, wherein the video vectorizor projects or sub-samples decoded DC image sequence in a predetermined direction so as to perform a data-compression, thereby vectorizing.

4. The gradual scene change detector in accordance with claim 1, wherein the video main processor comprises:
   a linear image predictor for predicting a linear image based on the vectorized image sequence from the video pre-processor;
   a first frame distance measurement device for measuring a distance between image frames based on a reference image from the linear image predictor; so as to produce a first measured distance;
   a second frame distance measurement device for measuring a distance between image frames based on the linear predicted image from the linear image predictor; so as to produce a second measured distance;
   a subtractor for producing a difference between the first measured distance and the second measured distance;
   a signal converter for converting the difference from the subtractor in accordance with whether any rapid scene changes is made or not;
   an accumulator for accumulating the difference of the subtractor applied from the signal converter; and
   a dissolve declaring/frame detecting device for declaring the temporal dissolve based on an accumulated value from the accumulator, and for detecting the initial frame position and the final frame position of the declared temporal dissolve.

5. The gradual scene change detector in accordance with claim 4, wherein if any rapid scene change is detected, the signal converter converts the difference of the subtractor into "0";
   if not, the signal converter transfers the difference of the subtractor to the accumulator.

6. The gradual scene change detector in accordance with claim 4, wherein the linear image predictor comprises:
   a first delay element for delaying the vectorized DC image sequence from the video pre-processor by a predetermined time;
   a second delay element for re-delaying the delayed image from the first delay element;
   an adder for adding the vectorized DC image and the re-delayed image from the second delay element; and
   a multiplier for multiplying the output value from the adder and a coefficient, so as to produce a linear predicted image.

7. The gradual scene change detector in accordance with claim 6, wherein the coefficient is '1/2'.

8. The gradual scene change detector in accordance with claim 4, wherein the first frame distance measurement device comprises:
   a histogram information extracting element for extracting a histogram information based on the delayed reference image from the linear image predictor;
   a delay element for delaying the extracted histogram information from the histogram information extractor by a predetermined time; and
   a vector distance measurement device for measuring a vector distance between the extracted histogram information from the histogram information extractor and the delayed histogram information.

9. The gradual scene change detector in accordance with claim 4, wherein the second frame distance measurement device comprises:
   a histogram information extractor for extracting a histogram information based on the linear predicted image from the linear image predictor;
   a vector distance measurement device for measuring a vector distance based on the extracted histogram information from the histogram information extractor and an extracted histogram information of the first frame distance measurement device.

10. The gradual scene change detector in accordance with claim 4, wherein the accumulator comprises:
    a discriminator for discriminating an output signal from the signal converter to '0' or '1';
    an adder for adding the output signal of the signal converter and a feedback accumulated value (D(i−1));
    a multiplier for multiplying the output signal of the discriminator and the added value of the adder so as to produce an accumulated value (D(i)); and
    a delay element for delaying the accumulated value from the multiplier by a predetermined time so as to feedback the delayed value to the adder.

11. The gradual scene change detector in accordance with claim 4, wherein the dissolve declaration and the temporal dissolve declaration of the frame detector is performed by:
    finding an accumulated value such that the highest value of the accumulated value (D(i)) within a duration longer than '0' is higher than a predetermined duration threshold value ($Th_{CLD}$); if the duration of the found accumulated value (D(i)) is longer than a predetermined continuation threshold value ($Th_{con}$), declaring the accumulated value as a temporal dissolve; and otherwise, the declaration being not performed.

12. The gradual scene change detector in accordance with claim 1, wherein the video post-processor comprises:
    a dissolve merging processor for confirming whether the distance between the declared temporal dissolves from the video main processor is smaller than a predetermined merging threshold value, and if so, for merging the smaller dissolves into one; and
    a dissolve declaration processor for confirming whether the distance between the initial frame position and the final frame position is higher than a predetermined distance threshold value so as to declare a dissolve.

13. The gradual scene change detector in accordance with claim 12, wherein the dissolve merging processor confirms whether the distance between the declared temporal dissolves from the video main processor is smaller than the predetermined merging threshold value ($TH_{link}$);
    if so, the dissolve merging processor merges the dissolves having smaller distance into one dissolve; and
    otherwise, the dissolve merging processor transfers the declared temporal dissolve to the dissolve declaration processor,
    wherein the dissolve declaration processor confirms whether the distance between the initial frame position and the final frame position of the dissolve merging processor is higher than the predetermined distance threshold value ($Th_{dis}$);
    if so, the dissolve declaration processor declares a dissolve when the distance between the initial frame position and the final frame position applied thereto is higher than the predetermined duration threshold value ($Th_{dur}$).

14. A gradual scene change detector for detecting a gradual scene change, comprising:
    a video main processor for determining a state of the image sequence based on a distance between frames of image sequence inputted from the video preprocessor so as to declare a temporal dissolve, and for detecting an initial frame position and a final frame position of the declared dissolve, wherein said video main processor includes:

a linear image predictor for predicting a linear image based on a vectorized image sequence;

a first frame distance measurement device for measuring a distance between image frames based on a reference image from the linear image predictor; so as to produce a first measured distance;

a second frame distance measurement device for measuring a distance between image frames based on the linear predicted image from the linear image predictor; so as to produce a second measured distance;

a subtractor for producing a difference between the first measured distance and the second measured distance;

a signal converter for converting the difference from the subtractor in accordance with whether or not any rapid scene changes is made;

an accumulator for accumulating the difference of the subtractor applied from the signal converter; and a dissolve declaring/frame detecting device for declaring the temporal dissolve based on an accumulated value from the accumulator, and for detecting the initial frame position and the final frame position of the declared temporal dissolve.

15. The gradual scene change detector in accordance with claim 14, wherein if any rapid scene change is detected, the signal converter converts the difference of the subtractor into "0";

if not, the signal converter transfers the difference of the subtractor to the accumulator.

16. The gradual scene change detector in accordance with claim 14, wherein the linear image predictor includes:

a first delay element for delaying the vectorized DC image sequence from the video pre-processor by a predetermined time;

a second delay element for re-delaying the delayed image from the first delay element;

an adder for adding the vectorized DC image and the re-delayed image from the second delay element; and a multiplier for multiplying the output value from the adder and a coefficient, so as to produce a linear predicted image.

17. The gradual scene change detector in accordance with claim 14, wherein the first frame distance measurement device comprises:

a histogram information extracting element for extracting a histogram information based on the delayed reference image from the linear image predictor;

a delay element for delaying the extracted histogram information from the histogram information extractor by a predetermined time; and a vector distance measurement device for measuring a vector distance between the extracted histogram information from the histogram information extractor and the delayed histogram information.

18. The gradual scene change detector in accordance with claim 14, wherein the second frame distance measurement device comprises:

a histogram information extractor for extracting a histogram information based on the linear predicted image from the linear image predictor;

a vector distance measurement device for measuring a vector distance based on the extracted histogram information from the histogram information extractor and an extracted histogram information of the first frame distance measurement device.

19. The gradual scene change detector in accordance with claim 14, wherein the accumulator comprises:

a discriminator for discriminating an output signal from the signal converter to '0' or '1';

an adder for adding the output signal of the signal converter and a feedback accumulated value (D(i−1));

a multiplier for multiplying the output signal of the discriminator and the added value of the adder so as to produce an accumulated value (D(i)); and a delay element for delaying the accumulated value from the multiplier by a predetermined time so as to feedback the delayed value to the adder.

20. The gradual scene change detector in accordance with claim 14, wherein the dissolve declaration and the temporal dissolve declaration of the frame detector is performed by:

finding an accumulated value such that the highest value of the accumulated value (D(i)) within a duration longer than '0' is higher than a predetermined duration threshold value ($Th_{CLD}$); if the duration of the found accumulated value (D(i)) is longer than a predetermined continuation threshold value ($Th_{con}$), declaring the accumulated value as a temporal dissolve; and otherwise, the declaration being not performed.

21. A method for detecting a gradual scene change comprising the steps of:

decoding an image sequence of digital video signal externally applied for vectorization;

discriminating the state of the image sequence based on the distance between frames in the vectorized image sequence so as to declare a temporal dissolve and detecting a initial frame position and a final frame position of the declared temporal dissolve; and merging the declared temporal dissolve in accordance with the distances of the declared temporal dissolve and declaring a dissolve in accordance with the distance between the initial and the final frames and the duration.

22. The method in accordance with claim 21, wherein the third step comprises:

a fourth step of confirming whether the distance between the declared temporal dissolves is a predetermined merging threshold value ($Th_{link}$);

a fifth step of merging the dissolves having the smaller distance into one, if the result of the step of the fourth step is positive, and otherwise transferring the declared temporal dissolve as it is;

a sixth step of confirming whether the distance between the initial frame and the final frame of the transferred dissolve is higher than a predetermined distance threshold value ($Th_{res}$) and the distance between the initial frame position and the final frame position of the transferred dissolve is higher than a predetermined duration threshold value; and a seventh step of declaring a dissolve if the result of the sixth step is positive.

23. A computer program device readable by a machine, tangibly embodying a program of instructions executable by the machine to perform a method comprising:

a first function of decoding an image sequence of digital video signal externally applied, so as for vectorization;

a second function of discriminating a state of the image sequence based on a frame distance between the vectorized image sequence so as to declare a temporal dissolve and detecting a initial frame position and a final frame position of the declared temporal dissolve; and a third function of merging the declared temporal dissolves in accordance with the distance between the declared temporal dissolves and declaring the dissolve in accordance with a distance and a duration between the initial frame and the final frame.

* * * * *